(12) United States Patent
Terai et al.

(10) Patent No.: US 11,652,236 B2
(45) Date of Patent: May 16, 2023

(54) SULFIDE SOLID ELECTROLYTE

(71) Applicant: IDEMITSU KOSAN CO., LTD., Chiyoda-ku (JP)

(72) Inventors: Kota Terai, Sodegaura (JP); Atsushi Sato, Sodegaura (JP); Futoshi Utsuno, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 17/591,183

(22) Filed: Feb. 2, 2022

(65) Prior Publication Data
US 2022/0158230 A1 May 19, 2022

Related U.S. Application Data

(63) Continuation of application No. 16/610,136, filed as application No. PCT/JP2018/019830 on May 23, 2018, now Pat. No. 11,276,881.

(30) Foreign Application Priority Data

May 24, 2017 (JP) .................. 2017-102950

(51) Int. Cl.
- H01M 4/02 (2006.01)
- H01M 10/0562 (2010.01)
- C01B 17/22 (2006.01)
- C01B 25/14 (2006.01)
- H01M 10/0525 (2010.01)

(52) U.S. Cl.
CPC ......... *H01M 10/0562* (2013.01); *C01B 17/22* (2013.01); *C01B 25/14* (2013.01); *H01M 10/0525* (2013.01); *C01P 2002/72* (2013.01); *C01P 2002/86* (2013.01); *C01P 2004/04* (2013.01); *C01P 2006/40* (2013.01); *H01M 2300/0068* (2013.01)

(58) Field of Classification Search
CPC ....................................................... H01M 4/02
See application file for complete search history.

(56) References Cited

U.S. PATENT DOCUMENTS

2010/0290969 A1  11/2010  Deiseroth et al.
2013/0164632 A1   6/2013  Kato et al.
(Continued)

FOREIGN PATENT DOCUMENTS

CN  103003890 A  3/2013
CN  103959546 A  7/2014
(Continued)

OTHER PUBLICATIONS

International Search Report dated Aug. 28, 2018 in PCT/JP2018/019830, 2 pages.
(Continued)

*Primary Examiner* — Jacob B Marks
(74) *Attorney, Agent, or Firm* — Oblon, McClelland, Maier & Neustadt, L.L.P.

(57) ABSTRACT

A sulfide solid electrolyte may include lithium, phosphorus and sulfur, and the sulfide solid electrolyte may have a diffraction peak A at 2θ=25.2±0.5 deg and a diffraction peak B at 29.7±0.5 deg in powder X-ray diffraction using CuKα rays, and a crystallite diameter in a range of from 5 to 20 nm.

14 Claims, 7 Drawing Sheets

(56) References Cited

U.S. PATENT DOCUMENTS

| | | | |
|---|---|---|---|
| 2014/0302382 A1 | 10/2014 | Kambara et al. | |
| 2014/0315103 A1 | 10/2014 | Higuchi | |
| 2015/0200421 A1* | 7/2015 | Homma | H01M 10/0525 |
| | | | 429/322 |
| 2016/0156064 A1 | 6/2016 | Miyashita et al. | |
| 2017/0222257 A1 | 8/2017 | Miyashita et al. | |
| 2017/0352916 A1 | 12/2017 | Miyashita et al. | |

FOREIGN PATENT DOCUMENTS

| | | |
|---|---|---|
| CN | 104025363 A | 9/2014 |
| JP | 2010-540396 A | 12/2010 |
| JP | 2013-201110 A | 10/2013 |
| JP | 2016-24874 A | 2/2016 |
| JP | 2017-10936 A | 1/2017 |
| WO | WO 2015/011937 A1 | 1/2015 |
| WO | WO 2015/012042 A1 | 1/2015 |
| WO | WO 2016/104702 A1 | 6/2016 |

OTHER PUBLICATIONS

English translation of the International Preliminary Report on Patentability and Written Opinion of the International Searching Authority dated Dec. 5, 2019 in PCT/JP2018/019830 filed May 23, 2018, 9 pages.

Combined Chinese Office Action and Search Report dated Jul. 15, 2022 in Chinese Patent Application No. 201880033384.3, 6 pages.

\* cited by examiner

SULFIDE SOLID ELECTROLYTE

CROSS-REFERENCE TO RELATED APPLICATIONS

The present application is a continuation of U.S. application Ser. No. 16/610,136, filed Nov. 1, 2019, and published as US 2020/0091552 A1, which was the national stage of PCT/JP2018/019830, filed May 23, 2018, claiming the benefit of the filing date of Japanese Appl. No. 2017-102950, filed May 24, 2017, the content of each of which is incorporated by reference herein.

TECHNICAL FIELD

The invention relates to a sulfide sold electrolyte.

BACKGROUND ART

With the rapid spread of information-related devices and communication devices such as personal computers, video cameras, mobile phones in recent years, the development of batteries used as power sources thereof has been emphasized. Among the batteries, lithium ion batteries are attracting attention from the viewpoint of high energy density.

A liquid electrolyte comprising a flammable organic solvent is used in conventional lithium-ion batteries currently on the market. Therefore, conventional lithium-ion batteries need attachment of a safety device which suppresses a temperature rise during a short circuit, and improvements in structure and material to prevent a short circuit. On the other hand, it is thought that, since a lithium ion battery obtained by allowing a battery to be totally solid by using a solid electrolyte instead of liquid electrolyte does not use a flammable organic solvent in a battery, simplification of a safety device can be attained, and a production cost can be saved or productivity can be improved.

A sulfide solid electrolyte is known as a solid electrolyte used in a lithium-ion battery. While there are various known crystal structures of sulfide solid electrolytes, a stable crystal structure which is difficult to change in structure in a wide temperature range is suitable from the perspective of widening the use temperature area of a battery. As such sulfide solid electrolytes, for example, sulfide sold electrolytes having argyrodite-type crystal structures (for example, see Patent Documents 1 to 5) have been developed.

RELATED ART DOCUMENTS

Patent Documents

Patent Document 1: JP 2010-540396 A
Patent Document 2: WO 2015/011937
Patent Document 3: WO 2015/012042
Patent Document 4: JP 2016-24874 A
Patent Document 5: WO 2018/104702

SUMMARY OF THE INVENTION

Sulfide solid electrolytes having argyrodite-type crystal structure are highly stable and some have high ionic conductivity. However, further improvements in such as processability at the time of manufacturing a battery and ionic conductivity are required.

It is an object of the invention to provide sulfide solid electrolytes having good processability at the time of manufacturing a battery and high ionic conductivity.

As a result of intensive studies by the present inventors, sulfide solid electrolytes having characteristics differing from those of conventional sulfide solid electrolytes having argyrodite type crystal structure have been discovered. In the sulfide solid electrolytes according to one embodiment of the present invention, a peak having a half-value width of 500 to 800 Hz are observed in solid-state $^{31}$P-NMR measurements. Further, in the sulfide solid electrolytes according to the one embodiment of the present invention has a diffraction peak A at 2θ=25.2±0.5 deg, and a diffraction peak B at 29.7±0.5 deg in powder X-ray diffraction, and a Si-relative half-value width of the diffraction peak B is 1.3 or more and 3.0 or less, and a Si-relative peak intensity of the diffraction peak B is 0.01 or more and 0.15 or lees. The above features are not observed in conventional sulfide solid electrolytes.

The present invention has found that the novel sulfide solid electrolyte having the above-mentioned characteristics has excellent processability, specifically, compaction property at the time of manufacturing a battery, and high ionic conductivity.

According to one embodiment of the present invention, there is provided a sulfide solid electrolyte comprising lithium, phosphorus and sulfur, having a diffraction peak A at 2θ=25.2±0.5 deg and a diffraction peak B at 29.7±0.5 deg in powder X-ray diffraction using CuKα radiation, and having a peak observed in the range of 60 to 120 ppm in solid state $^{31}$P-NMR measurements, and having at least one half-value width of the peak obtained by peak-separating the peaks is 500 to 800 Hz.

According to another embodiment there is provided sulfide solid electrolytes comprising lithium, phosphorus, and sulfur, having a diffraction peak A at 2θ=25.2±0.5 deg, a diffraction peak B at 29.7±0.5 deg, a Si relative half-value width of the diffraction peak B of 1.3 or more and 3.0 or less, and a Si relative peak intensity of the diffraction peak B of 0.01 or more and 0.15 or less in powder X-ray diffraction using CuKα rays.

According to one embodiment of the present invention, it is possible to provide sulfide sold electrolytes having good processability and high ionic conductivity at the time of manufacturing a battery.

MODE FOR CARRYING OUT THE INVENTION

First Embodiment

Figure 1:
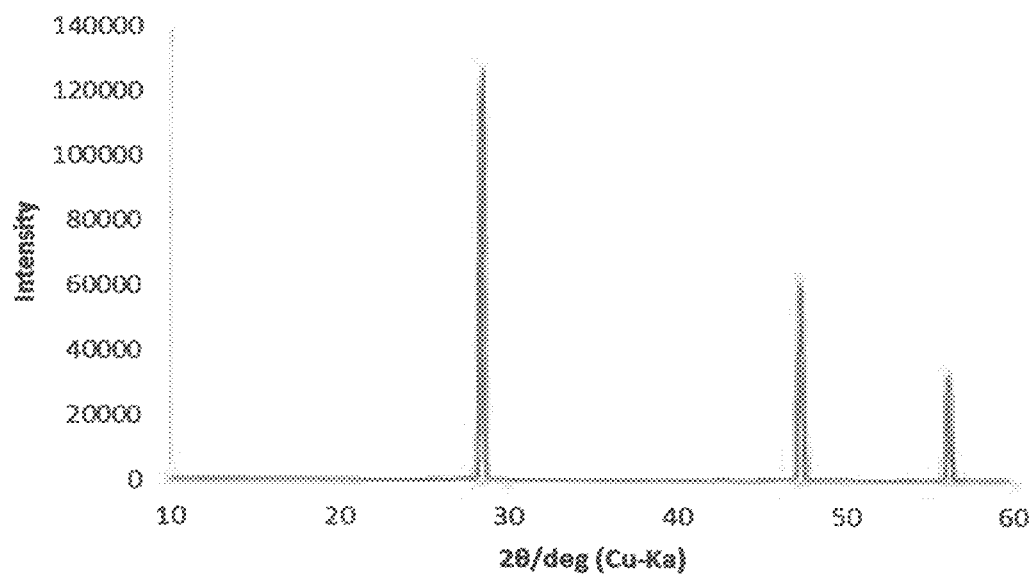
FIG. 1 is an X-ray diffraction (XRD) pattern of a standard sample (Si).

The sulfide solid electrolyte according to one embodiment of the present invention comprises lithium (Li), phosphorus (P), and sulfur (S) as constituent elements. It is characterized in that the following requirements 1 and 2 are satisfied.

Requirement 1

The sulfide solid electrolyte has a diffraction peak A at $2\theta=25.2\pm0.5$ deg and a diffraction peak B at $29.7\pm0.5$ deg in powder X-ray diffraction using CuKα rays.

Requirement 2

The half-value width of at least one of peak obtained by separating the peaks observed in the range of 80 to 120 ppm ranges for sold-state $^{31}$P-NMR measurements is 500 to 800 Hz.

In the present application, the expression "X to Y" indicating the range means "X or more and Y or less."

For the above Requirement 1, the diffraction peak A and the diffraction peak B are peaks derived from argyrodite-type crystal structure. In addition to the diffraction peak A and the diffraction peak B, the diffraction peaks of argyrodite-type crystal structure may also appear, for example, at $2\theta=15.3\pm10.5$ deg, $17.7\pm0.5$ deg, $31.1\pm0.5$ deg, $44.9\pm0.5$ deg, or $47.7\pm0.5$ deg. The sulfide solid electrolyte of the present invention may have these peaks.

In the present application, the position of the diffractive peak is determined by A±0.5 deg when the median value is A, but A±10.3 deg is preferably. For example, in the case of the diffraction peak of $2\theta=25.2\pm0.5$ deg, the median value A is 25.2 deg, and it is preferable that the median value A exist in the range of $2\theta=25.2\pm0.3$ deg. The same can be applied to determination of all of the other diffraction peak positions in the present invention.

For the above Requirement 2, the peaks from argyrodite-type crystal structure and the peaks from glass comprised in the sulfide solid electrolytes are observed in the range of 60 to 120 ppm in the solid-state $^{31}$P-NMR Spectrum. Generally, the peak derived from the crystal has a relatively narrow half-value width, and the peak derived from the glass has a relatively wide half-value width. For example, in the measurement results of the embodiment and the comparative example of the present application, the half-value width of the peak derived from the crystal is 450 Hz or less, whereas the half-value width of the peak derived from the glass is larger than 1000 Hz.

On the other hand, in the sulfide solid electrolyte of the present embodiment, one or more peaks having a half-value width of 500 Hz to 800 Hz are observed. In the present embodiment, it is preferable that the half-value width of the peak having the largest peak area ratio is 500 to 800 Hz. The area ratio of the peak having the half-value width of 500 to 800 Hz is preferably 20 to 100%, preferably 40 to 100%, more preferably 60 to 100%, still more preferably 70 to 100%, and particularly preferably 75 to 100%.

From the above Requirements 1, it is defined that the sulfide solid electrolyte of the present embodiment comprises argyrodite-type crystal structure. However, Requirement 2 indicates that the conventional argyrodite-type crystal structure re and the argyrodite-type crystal structure of the present embodiment differ in form from each other. Having a half-value width in the above ranges is presumed to mean that the argyrodite-type crystal structure of the present embodiment is a distorted structure slightly deviating from the position of atom n the conventional crystal structure. It is considered that, because of the distorted structure, plastic deformation due to stress easily occurs and processability is improved.

In the present embodiment, it is preferable that the ratio of the area of the glass-derived peak to the total area of all peaks at 60 to 120 ppm, which is observed in solid-state $^{31}$P-NMR measurements, be 0% or more and 10% or less. This further improves the ionic conductivity of the sulfide solid electrolyte. The area ratio is more preferably 8% or less, particularly preferably 5% or less.

Generally, since glass has a structure softer than crystal, the processability of sulfide sold electrolytes at the time of manufacturing a battery improves by comprising a large amount of glass (reference: JP 2006-103203 A). However, glass has a lower ionic conductivity than argyrodite-type crystal structure. Therefore, when glass is comprised, the ionic conductivity is lowered. In the present invention, the processability is improved not by comprising a large amount of glass but by making the crystal form different from the conventional form. The argyrodite-type crystal structure itself is present and has a higher ionic conductivity.

Determination of peaks by solid-state $^{31}$P-NMR measurement, the half-value width and the area ratio of each peak are calculated by separating signals observed at 60 to 120 ppm in the sold-state $^{31}$P-NMR spectrum into each peak by a nonlinear least squares method, and measuring the half-value width of each peak.

Chemical shifts of the sulfide solid electrolyte obtained by sold-state $^{31}$P-NMR measurements vary depending on the arrangement state of the atom, the coordination number and coordination state of the surrounding atom, and the Ike. In addition, since averaging of chemical shills due to molecular motion does not occur in crystal and glass comprised in the sulfide sold electrolyte, spectra corresponding to al of these structures are observed.

The argyrodite-type crystal structure comprises a $PS_4^{3-}$ structure in the crystal, but the position of chemical shifts of peaks obtained by solid-state $^{31}$P-NMR measurements in each crystal differs due to the difference in symmetry of the crystal and the difference in coordination states of atom around the $PS_4^{3-}$ structure. On the other hand, as the glass, a glass composed of a $PS_4^{3-}$ structure, a $P_2S_7^{4-}$ structure, and a $P_2S_6^{4-}$ structure has been reported, and the chemical shifts of these chemical structures are observed in a position different from the chemical shifts position of the peaks of the crystal, or the half-value width are greatly different.

By utilizing the above-mentioned difference, in sulfide sold electrolytes, the sold $^{31}$P-NMR spectrum can be separated into a crystal-derived peak and a glass-derived peak, and the respective amounts can be quantified. Details will be described in the following Examples. Each peak area indicates the amount of phosphorus present in the same surrounding environment.

Second Embodiment

The sulfide solid electrolyte according to another embodiment comprises lithium, phosphorus, and sulfur as constituent elements. It is characterized in that the following requirements 1 and 3 are satisfied.

Requirement 1

The sulfide solid electrolyte has a diffraction peak A at $2\theta=25.2\pm0.5$ deg and a diffraction peak B at $29.7\pm0.5$ deg in powder X-ray diffraction using CuKα rays.

Requirement 3

A Si-relative half-value width of the diffraction peek B is 1.3 or more and 3.0 or less, and a Si relative peak intensity of the diffraction peak B is 0.01 or more and 0.15 or less.

Requirement 1 is the same as those of the first embodiment described above.

Requirement 3 defines that the typical diffraction peak of the argyrodite-type crystal structure (diffraction peak B) has a wide Si-relative half-value width and a strong peak intensity. It is known that the half-value width of the diffractive peak correlates with the crystallite diameter, and the half-value width increases as the crystallite diameter decreases (Sheller's formula). On the other hand, the strong peak intensity indicates that the amount of the argyrodite-type crystal structure comprised in the sulfide solid electrolyte is large. Here, when the sulfide solid electrolyte is in the glass state, the half-value width becomes extremely large, and the diffraction peak is broadened. However, in this case, the diffraction peak intensity derived from the crystal should be small because the amount of crystal present is small. In this embodiment, the diffractive peaks derived from the argyrodite-type crystal structure have large half-value widths and large intensities. That is, it is shown that a lager amount of the argyrodite-type crystal structure having a smaller crystallite diameter than the conventional crystallite is comprised. It is considered that the interface between the crystallites exists in a large amount and when stress is applied, the interface is plastically deformed as a sliding surface, so that the processability is improved.

The Si-relative half-value width of the diffraction peak B is preferably 1.5 or more and 2.8 or less, more preferably 1.6 or more and 2.5 or less, still more preferably 1.8 or more and 2.4 or less, and particularly preferably 2.0 or more and 2.4 or less. The Si-relative peak intensity of the diffraction peak B is preferably 0.02 or more and 0.12 or less, more preferably 0.04 or more and 0.1 or less, still more preferably 0.04 or more and 0.08 or less, and particularly preferably 0.05 or more and 0.07 or less.

Note that the Si-relative half-value width and the Si-relative peak intensity of the diffraction peak B are ratios with respect to the measured value of the diffraction peak of Si at $2\theta=28.6\pm0.5$ deg, using Si as a standard sample. In order to correct a variation in the measured value of the diffraction peak B due to a difference in the measurement apparatus or the like, the relative value is obtained by a standard sample. Details of the measurement method are given in Examples.

It can also be confirmed by calculating the reduced pair distribution function [G(r)] of the radiation XRD or neutron diffraction that the sulfide solid electrolyte of the present embodiment has a crystallinity and has small crystallite diameter. G(r) can also evaluate atom correlations over relatively medium-to-long distances of 10 Å or more. In G(r), when the sulfide sold electrolyte of the present embodiment is compared with the sulfide sold electrolyte produced by a conventional process (the crystallite diameter is large), both of the periodicities in the short distance range of less than 5 nm are equivalent, but the periodicity differs in the long distance range of 5 to 10 nm. These fads suggest that both have the same crystal structure in the distance range of less than 5 nm, but do not have the same periodic structure in the distance range of 5 nm or more, that is, the crystallite diameter of the sulfide solid electrolyte of the present embodiment is less than 5 nm.

In addition, the crystallites of the sulfide solid electrolyte of the present embodiment are composed of smaller-sized particles, which can be confirmed by transmission electrons microscopy (TEM) observations. Since the sulfide sample is weak to strong electron ray such as TEM, it needs to be cooled at a low temperature. In addition, by observing to a dark field image comprising spots of electron ray diffractometry, the presence of minute crystallites in the particle and the particle diameter thereof can be confirmed.

The sulfide solid electrolytes of the above-mentioned first embodiment and second embodiment (hereinafter collectively referred to as the sulfide solid electrolytes of the present invention) are characterized by excellent compaction properties. Sulfide solid electrolytes having a crystal structure of a stable phase, such as conventional argyrodite-type crystal structure and LGPS-type crystal structure, require heat treatment at a high temperature (e.g., 550° C.) during manufacturing. Generally, heat treatment at high temperature promotes crystallization and increases crystallinity. It is considered that high ionic conductivity is developed by increasing the amount of crystals comprised in the sulfide solid electrolyte. However, on the other hand, the sulfide solid electrolyte may become hard because the interface between the crystallites becomes strong. Hardness of the sulfide solid electrolyte causes various problems in manufacturing a battery. For example, when the solid electrolyte layer is formed by pressurizing and adhering the sulfide solid electrolyte particles (compaction molding), since the particles are hardly deformed, the contact area between the particles becomes sun, and ion paths may not be sufficiently formed. When the electrode layer is formed, the active material particles used may be broken when the electrode layer is mimed with sulfide solid electrolyte particles.

Since the sulfide solid electrolyte of the present invention has a crystal form different from that of the conventional sulfide solid electrolyte, it is presumed that the hardness of the sulfide solid electrolyte particles is lowered. As a result, the density at the time of compaction molding becomes higher than that of the conventional sulfide solid electrolyte (compaction property is improved).

In addition, since it has argyrodite-type crystal structure, it has a higher ionic conductivity.

In the first embodiment described above, the Si-relative half-value width of the diffractive peak B is preferably 1.3 or more and 3.0 or less, more preferably 1.5 or more and 2.8 or less, more preferably 1.6 or more and 2.5 or less, still more preferably 1.8 or more and 2.4 or less, and particularly preferably 2.0 or more and 2.3 or less. The Si-relative peak intensity of the diffraction peak B is preferably 0.01 or more and 0.15 or less, more preferably 0.02 or more and 0.12 or less, more preferably 0.04 or more and 0.1 or less, still more preferably 0.04 or more and 0.08 or less, and particularly preferably 0.05 or more and 0.07 or less.

In the second embodiment, it is preferable that the ratio of the glass-derived peak area to the total area of al peaks in the range of 60 to 120 ppm, which is observed in the solid-state $^{31}$P-NMR measurements, is 0% or more and 10% or less. The area ratio is more preferably 8% or less, particularly preferably 5% or less.

In addition to above Li, P, and S, halogen may be comprised as a constituent element in the sulfide solid electrolyte according to one embodiment of the present invention. Examples of halogen include F, Cl, Br and I. In this embodiment, it is preferable to comprise Cl or Br, and in particular, it is preferable to comprise Cl and Br.

It may comprise an element such as Si, Ge, Sn, Pb, B, Al, Ga, As, Sb, or Bi. Further, it may comprise a chalcogen element (oxygen (O), selenium (Se), tellurium (Te), or the like).

In the sulfide sold electrolyte according to one embodiment of the present invention, it is preferable that the molar ratio of the lithium to the phosphorus, a (Li/P), the molar ratio of the sulfur to the phosphors, b (S/P), and the molar ratio of the halogen to the phosphorus, c (X/P), satisfy the following formulas (A) to (C).

$$5.05 \le a \le 7.5 \quad (A)$$

$$6.5 \le a+c \le 7.5 \quad (B)$$

$$0.55 \le a-b \le 1.5 \quad (C)$$

(In the formulas, b>0 and c>0 are satisfied.)

When the sulfide sold electrolyte comprises one or more elements M selected from the group consisting of Si, Ge, So, Pb, B, Al, Ga, As, Sb, and Bi, the molar ratio of each element in the above (A) to (C) is a molar ratio to the total of the element M and phosphorus. For example, the molar ratio of the lithium to the phosphorus, a (Li/P), is Li/(P+M).

When the molar ratio of F or Cl in the whole halogen is the largest, the above formula (A) is preferably $5.0 \le a \le 6.5$, particularly preferably $5.2 \le a \le 6.0$. When the molar ratio of Br is the largest, formula (A) is preferably $5.2 \le a \le 6.8$, particularly preferably $5.3 \le a \le 6.6$. When the molar ratio of I is the largest, the formula (A) is preferably $5.5 \le a \le 7.2$, particularly preferably $5.5 \le a \le 7.0$.

The formula (B) is preferably $6.6 \le a+c \le 7.4$, particularly preferably $6.7 \le a+c \le 7.3$.

The above formula (C) is preferably $0.6 \le a-b \le 1.3$, particularly preferably $0.7 \le a-b \le 1.3$.

The sulfide sold electrolyte according to one embodiment of the present invention preferably has, for example, a composition represented by the following formula (1).

(In the formula, M is one or more elements selected from the group consisting of Si, Ge, Sn, Pb, B, Al, Ga, As, Sb, and Bi, and X is one or more elements selected from the group consisting of F, Cl, Br, and I; a to c satisfies the following formulas (A) to (C); and α is 0≤a≤0.3.)

$$5.0 \le a \le 7.5 \quad (A)$$

$$6.5 \le a+c \le 7.5 \quad (B)$$

$$0.55 \le a-b \le 1.5 \quad (C)$$

(In formula, b>0 and c>0 are satisfied.)

X in the formula (1) represents one or more elements selected from the group consisting of F, Cl. Br, and I ($x_1, \ldots, x_n$: n is an integer of 1 or more and 4 or less). X is preferably composed of one element ($x_1$) or two elements ($x_1$, $x_2$), particularly preferably two elements. The molar ratio of each element is not particularly limited.

α is preferably 0.

The formula (B) is preferably $6.6 \le a+c \le 7.4$, particularly preferably $6.7 \le a+c \le 7.3$.

The formula (C) is preferably $0.6 \le a-b \le 1.3$, particularly preferably $0.7 \le a-b \le 1.3$.

In the formula (1), when the molar ratio of F or Cl to whole X is the largest, the formula (A) is preferably $5.0 \le a \le 6.5$, particularly preferably $5.2 \le a < 6.0$. Wen the molar ratio of Br is the largest, the formula (A) is preferably $5.2 \le a \le 6.8$, particularly preferably $5.3 \le a \le 6.6$. When the molar ratio of I is the largest, the formula (A) is preferably $5.5 \le a \le 7.2$, particularly preferably $5.5 \le a \le 7.0$.

The above-mentioned molar ratio and composition of each element are not in the molar ratio and composition of the Input raw material used for manufacturing, but in the sulfide solid electrolyte which is a product. The molar ratio of each element can be controlled by, for example, adjusting the content of each element in the raw material.

In the present application, the molar ratio and composition of each element in the sulfide solid electrolyte can be measured by, for example, ICP emission spectrometry, ion chromatography, RBS method, AES method, or X-ray fluorescence method. In the present application, values measured by an ICP emission spectrometry are used except for special circumstances such as difficulty in analysis. The method for measuring by ICP emission spectrometry is described in the Examples.

The sulfide solid electrolyte of the present invention can be produced, for example, by reacting a mixture of raw materials by applying a mechanical stress stronger than a conventional method.

Herein, "applying a mechanical stress" is to mechanically apply shear stress, impact force, or the like. As means for applying a mechanical stress, a pulverizer such as a planetary ball mill, a vibration mill and a rolling mill, a kneader, etc. can be given. In these apparatuses, raw materials may be pulverized and mixed.

The conditions of the pulverizing and mixing may be appropriately actuated depending on the device used and the like. For example, when a planetary ball mill is used, the rotation speed may be set to several tens to several hundreds of revolutions per minute, and the processing may be performed for 0.5 hours to 100 hours. More specifically, in the case of the planetary ball mill (Model No. P-7, manufactured by Fritsch Co.) used in the present Examples, the rotation speed of the planetary ball mill is preferably 450 rpm or more and 700 rpm or less, more preferably 500 rpm or more and 650 rpm or less. Conventionally, when the raw material is pulverized and mixed (mechanical milling) by the above-mentioned apparatus, the rotation speed of the planetary ball mil is generally 350 rpm or more and 400 rpm or less. In this manufacturing method, a strong impact force is applied to the raw material by malting the rotation speed much faster than in the conventional method.

For example, when a ball made of zirconia is used as the pulverization media, Its diameter is preferably 0.2 to 20 mm.

The temperature at the time of mixing is not particularly set and may be room temperature, and there is no particular need to control the temperature, but when the temperature is high, crystallization may be promoted in some cases. The temperature at the time of mixing is preferably 0° C. or more and 300° C. or less, more preferably 20° C. or more and 250° C. or less.

In the prior art (e.g., Patent Document 2), a argyrodite-type crystal structure is formed by pulverizing and mixing the raw material powder to such an extent that the crystallinity of the raw material powder can be maintained, followed by heat treatment at a high temperature. In addition, in Patent Document 1, the raw material is heated at 550° C. for 6 days to form an argyrodite-type crystal structure. On the other hand, in the above method, sulfide solid electrolytes having an argyrodite-type crystal structure differing from the conventional solid electrolytes can be produced by applying mechanical stresses stronger than a conventional method to react with each other. In this method, since the raw material does not need to be heat-treated at a high temperature, crystal growth due to the heat treatment does not occur.

The raw material used is a combination of two or more kinds of compounds or simple substances, which are comprised in the sulfide sold electrolyte as an essential element, i.e., lithium, phosphorus and sulfur, and optionally an element such as halogen, as a whole.

Examples of the raw material comprising lithium include, for example, lithium compound such as lithium sulfide ($Li_2S$), Fithian oxide ($Li_2O$), lithium carbonate ($Li_2CO_3$), and lithium metal simple substance can be given. Among them, a lithium compound is preferable, and lithium sulfide is more preferable.

The lithium sulfide can be used without any particular limitation, but a lithium sulfide having a high purity is preferable. Lithium sulfide can be produced, for example, by the method described in JP-H07-330312 A. JP-H09-283156 A, JP 2010-163356 A, and JP 2011-84438 A.

Specifically, lithium hydroxide and hydrogen sulfide are reacted in a hydrocarbon-based organic solvent at 70° C. to 300° C. to form lithium hydrosulfide, and subsequently, hydrogen sulfide is removed from this reaction liquid, thereby to produce lithium sulfide (JP 2010-163356 A).

Further, by reacting lithium hydroxide and hydrogen sulfide in an aqueous solvent at 10° C. to 100° C. to form lithium hydrosulfide, and subsequently, hydrogen sulfide is removed from this reaction liquid, thereby to produce lithium sulfide (JP 2011-84438 A).

Examples of the raw material comprising phosphorus include phosphorus sulfide such as diphosphorus trisulfide ($P_2S_3$) and diphosphorus pentasulfide ($P_2S_5$) and, phosphorus compound such as sodium phosphate ($Na_3PO_4$), and phosphorus simple substance. Among these, phosphorus sulfide is preferable, and diphosphorus pentasulfide ($P_2S_5$) is more preferable. A phosphorus compound such as diphosphorus pentasulfide ($P_2S_5$) and a phosphorus simple substance can be used without particular limitation as long as they are manufactured and sold industrially.

The raw material comprising halogen preferably comprises halogen compound represented by the following formula (2), for example.

$$M_l-X_m \qquad (2)$$

In the formula (2), M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi), or a combination of these elements with oxygen or sulfur, and Li or P is preferable, and lithium (Li) is particularly preferable.

X is a halogen element selected from the group consisting of F, Cl, Br, and I.

Moreover, l is an integer of 1 or 2, and m is an integer of 1 to 10. When m is an integer of 2 to 10, that is, when a plurality of X presents, X may be the same or different. For example, in the case of $SiBrCl_3$ mentioned later, m is 4, and X are different elements, i.e. Br and Cl.

Specific examples of the halogen compound represented by the above formula (2) include sodium halide such as NaI, NaF, NaCl, and NaBr; lithium halide such as LiF, LiCl, LiBr, and LiI; boron halide such as $BCl_3$, $BBr_3$, and $BI_3$; aluminum halide such as $AlF_3$, $AlBr_3$, $AlI_3$, and $AlCl_3$; silicon halide such as $SiF_4$, $SiCl_4$, $SiCl_3$, $Si_2Cl_6$, $SiBr_4$, $SiBrCl_3$, $SiBr_2Cl_2$, and $SiI_4$; phosphorus halide such as $PF_3$, $PF_5$, $PCl_3$, $PCl_5$, $POCl_3$, $PBr_3$, $POBr_3$, $PI_3$, $P_2Cl_4$, and $P_2I_4$; sulfur halide such as $SF_2$, $SF_4$, $SF_6$, $S_2F_{10}$, $SCl_2$, $S_2Cl_2$, and $S_2Br_2$; germanium halide such as $GeF_4$, $GeCl_4$, $GeBr_4$, $GeI_4$, $GeF_2$, $GeCl_2$, $GeBr_2$, and $GeI_2$; arsenic halide such as $AsF_3$, $AsCl_3$, $AsBr_3$, $AsI_3$, and $AsF_5$; selenium halide such as $SeF_4$, $SeF_6$, $SeCl_2$, $SeCl_4$, $Se_2Br_2$, and $SeBr_4$; tin halide such as $SnF_4$, $SnCl_4$, $SnBr_4$, $SnI_4$, $SnF_2$, $SnCl_2$, $SnBr_2$, and $SnI_2$; antimony halide such as $SbF_3$, $SbCl_3$, $SbBr_3$, $SbI_3$, $SbF_5$, and $SbCl_5$ tellurium halide such as $TeF_4$, $Te_2F_{10}$, $TeF_6$, $TeCl_2$, $TeCl_4$, $TeBr_2$, $TeBr_4$, and $TeI_4$; lead halide such as $PbF_4$, $PbCl_4$, $PbF_2$, $PbCl_2$, $PbBr_2$, and $PbI_2$; and bismuth halide such as $BiF_3$, $BiCl_3$, $BiBr_3$, and $BiI_3$.

Among these, lithium halides such as lithium chloride (LiCl), lithium bromide (LiBr), and lithium iodide (LiI), phosphorus halides such as phosphorus pentachloride ($PCl_5$), phosphorus trichloride ($PCl_3$), phosphorus pentabromide ($PBr_5$), and phosphorus tribromide ($PBr_3$) are preferable. Among them, lithium halides such as LiCl, LiBr and LiI, and $PBr_3$ are preferable, lithium halides such as LiCl, LiBr and LiI are More preferable, and LiCl and LiBr are particularly preferable.

One of the kinds of halogen compounds described above may be used alone, or a combination of two or more kinds may be used.

In one embodiment, at least one of lithium compound, phosphorus compound, and halogen compound is preferably comprised, at least one of lithium compound and phosphorus compound preferably comprise sulfur, more preferably comprise a combination of lithium sulfide, phosphorus sulfide, and lithium halide, and still more preferably comprise a combination of lithium sulfide, diphosphorus pentasulfide, and lithium halide.

For example, when $Li_2S$, $P_2S_5$, LiCl, and LiBr are used as the raw material of the sulfide solid electrolyte, the molar ratio of the input raw material can be $Li_2S:P_2S_5:LiCl$ and LiBr=30 to 60:10 to 25:15 to 50.

For example, when $Li_2S$, $P_2S_5$, lithium halide (LiX), or sulfur (S) is used as the raw material of the sulfide solid electrolyte of the present invention, the molar ratio of the input raw material can be $Li_2S:P_2S_5:LiX:S=45$ to 70:8 to 15:20 to 40:more than 0 and 20 or less. The sulfide sold electrolyte of the present invention can be obtained by applying mechanical stress to these raw materials and reacting them.

The sulfide solid electrolyte of the present invention can be used in a solid electrolyte layer, a positive electrode, a negative electrode, etc. of a lithium ion secondary battery.

[Electrode Mix]

The electrode mix according to one embodiment of the present invention comprises the above-mentioned sulfide solid electrolyte of the present invention and an active mater. Alternatively, the electrode mix is produced by the sulfide solid electrolyte of the present invention. When a negative electrode active material is used as the active material, the electrode mix becomes a negative electrode mix. On the other hand, when a positive electrode active material is used, the electrode nix becomes a positive electrode mix.

Negative Electrode Mix

A negative electrode mix is obtained by incorporating a negative electrode material to the sulfide sold electrolyte of the present invention.

As the negative electrode active material, for example, a carbon material, a metal material, or the like can be used. A complex composed of two or more of these can also be used. Further, a negative electrode active material that will be developed in the future can be used.

It is preferred that the negative electrode active material have electron conductivity.

The carbon materials include graphite (e.g., artificial graphite), graphite carbon fiber, resin fired carbon, pyrolytic vapor-grown carbon, coke, mesocarbon microbeads (MCMB), fired carbon of furfuryl alcohol resin, polyacene, pitch-based carbon fibers, vapor grown carbon fibers, natural graphite, non-graphitizable carbon and the like can be given.

Examples of the metallic material include a simple metal substance, alloys, and metal compounds. Examples of the metal simple substance include metallic silicon, metallic tin, metallic lithium, metallic indium, and metallic aluminum. Examples of the alloy include an alloy comprising at least one of silicon, tin, lithium, indium, and aluminum. Examples of the metal compound include a metal oxide. The metal oxide is, for example, silicon oxide, tin oxide or aluminum oxide.

The blending ratio of the negative electrode active material and the solid electrolyte is preferably the negative electrode active material:the solid electrolyte=95 wt %:5 wt % to 5 wt %:95 wt %, more preferably 90 wt %:10 wt % to 10 wt %:90 wt %, and still more preferably 85 wt %:15 wt % to 15 wt %:85 wt %.

When the content of the negative electrode active material in the negative electrode mix is too small, the electric capacity becomes small. Further, when the negative electrode active material has electron conductivity and does not comprise a conductive aid, or comprises only a small amount of a conductive aid, it is considered that the electron conductivity (electron conduction path) in the negative electrode may be lowered to decrease the rate characteristic, or the utilization rate of the negative electrode active material may be lowered to decrease the electric capacity. On the other hand, when the content of the negative electrode active material in the negative electrode mix is too large, it is considered that the ionic conductivity (ion conduction path) in the negative electrode may be lowered to decrease the rate characteristics, or the utilization factor of the negative electrode active material may be lowered to decrease the electronic capacity.

The negative electrode mix may farther comprise a conductive aid.

When the electron conductivity of the negative electrode active material is low, it is preferable to add a conductive aid. The conductive aid may have conductivity, and its electronic conductivity is preferably $1\times10^3$ S/cm or more, more preferably $1\times10^5$ S/cm or more.

Specific examples of the conductive aid include a substance preferably comprising at least one element selected from the group consisting of carbon material, nickel, copper, aluminium, indium, silver, cobalt, magnesium, lithium, chromium, gold, ruthenium, platinum, beryllium, iridium, molybdenum, niobium, osmium, rhodium, tungsten, and zinc, and more preferably carbon simple substance, carbon material other than carbon simple substance, and a metal simple substance, mixtures or compound of metal comprising nickel, copper, silver, cobalt, magnesium, lithium, ruthenium, gold, platinum, niobium, osmium or thorium.

Specific examples of carbon material include carbon black such as Ketjenblack, acetylene black, Dencablack, thermal black, channel black, and the like: graphite, carbon fiber, activated carbon, and the like, which can be used alone or in combination with two or more kinds. Among them, acetylene black, Dencablack, and Ketjenblack having high electron conductivity are preferable.

The content of the conductive aid in the case where the negative electrode mix comprises the conductive aid is preferably 1 to 40% by weight, more preferably 2 to 20% by weight. It is considered that when the content of the conductive aid is too small, the electronic conductivity of the negative electrode may be lowered to decrease the rate characteristic, or the utilization rate of the negative electrode active material may be lowered to decrease the electric capacity. On the other hand, when the content of the conductive aid is too large, the amount of the negative electrode active maternal and/or the amount of the solid electrolyte decreases. It is presumed that when the amount of the negative electrode active material decreases, the electric capacity decreases. In addition, it is considered that when the amount of the solid electrolyte is reduced, the ionic conductivity of the negative electrode may be lowered to decrease the rate characteristics or the utilization rate of the negative electrode mix may be lowered to decrease the electric is capacity.

In order to bind the negative electrode active material and the solid electrolyte tightly to each other, a binder may be further comprised.

As the binder, fluorine-comprising resins such as polytetrafluoroethylene (PTFE), polyvinylidene fluoride (PVDF), and fluorine rubber; thermoplastic resins such as polypropylene and polyethylene; ethylene-propylene-diene rubber (EPDM), sulfonated EPDM, natural butyl rubber (NBR), and the like can be used alone or as mixtures of two or more kinds. In addition, an aqueous dispersion of cellulose or styrene butadiene rubber (SBR), which is an aqueous under, can be used.

The negative electrode mix can be produced by mixing the solid electrolyte, the negative electrode active material, and an arbitrary conductive aid and/or binder.

The mixing method is not particularly limited, for example, s dry mixing using a mortar, a ball mill, a bead mill, a jet mill, a planetary ball mill, a vibrating ball mill, a sand mill, a cutter mill; and a wet mixing using a mortar, a ball mill, a bead mill, a planetary ball mill, a vibrating ball mill, a sand mill, and a fill mix after dispersing the raw material in an organic solvent to blend and then remove the solvent can be applied. Among them, wet mixing is preferable in order not to destroy the negative electrode active material particles.

Positive Electrode Mix

A positive electrode mix can be obtained by blending a positive electrode active malarial into the solid electrolyte of the present invention.

The positive electrode active material is a material capable of intercalating and desorbing lithium ions, and a material publicly known as a positive electrode active material in the field of batteries can be used. Further, a positive electrode active material to be developed in the future can also be used.

Examples of the positive electrode active material include metal oxides, sulfides, and the like. Sulfides include metal sulfides and non-metal sulfides.

The metal oxide is, for example, a transition metal oxide. More specifically, $V_2O_5$, $V_6O_{13}$, $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, $a+b+c=1$); $LiNi_{1-Y}Co_YO_2$, $LiCo_{1-Y}Mn_YO_2$, $LiNi_{1-Y}Mn_YO_2$ (where $0\leq Y<1$); $Li(Ni_aCo_bMn_c)O_4$ ($0<a<2$, $0<b<2$, $0<c<2$, $a+b+c=2$), $LiMn_{2-Z}Ni_ZO_4$, $LiMn_{2-Z}Co_ZO_4$ (where $0<Z<2$); $LiCoPO_4$, $LiFePO_4$, CuO, $Li(Ni_aCo_bAl_c)O_2$ (where $0<a<1$, $0<b<1$, $0<c<1$, $a+b+c=1$), and the like can be given.

Examples of the metal sulfide include titanium sulfide ($TiS_2$), molybdenum sulfide ($MoS_2$), iron sulfide (FeS, $FeS_2$), copper sulfide (CuS), nickel sulfide ($Ni_3S_2$), and the like.

In addition, examples of the metal oxide include bismuth oxide ($Bi_2O_3$), bismuth lead oxide ($Bi_2Pb_2O_5$), and the like.

Examples of non-metal sulfides include organic disulfide compounds and carbon sulfide compounds.

In addition to those mentioned above, niobium selenide ($NbSe_3$), metal indium, sulfur can also be used as the positive electrode active material.

The positive electrode mix may further comprise a conductive aid.

The conductive aid is the same as that of the negative electrode mix.

The mixing ratio of the solid electrode and the positive electrode active material of the positive electrode mix, the content of the conductive aid and the method for producing the positive electrode mix are the same as those of the above-mentioned negative electrode mix.

[Lithium Ion Battery]

The lithium-ion battery according to one embodiment of the present invention comprises at least one of the sulfide solid electrolyte and the electrode mix of the present invention described above. Alternatively, it is produced by at least one of the sulfide solid electrolyte and the electrode mix of the present invention.

The constituent of the lithium ion battery is not particularly limited, but generally has a structure in which a negative electrode layer, an electrolyte layer, and a positive electrode layer are laminated in this order. Hereinafter, each layer of the lithium ion battery will be described.

(1) Negative Electrode Layer

The negative electrode layer is preferably a layer that is produced from the negative electrode mix of the present invention.

Alternatively, the negative electrode layer is a layer that comprises the negative electrode mix of the present invention.

The thickness of the negative electrode layer is preferably 100 nm or more and 5 mm or less, more preferably 1 μm or more and 3 mm or less, and still more preferably 5 μm or more and 1 mm or less.

The negative electrode layer can be produced by a publicly known method. For example, it can be produced by a dating method, an electrostatic method (electrostatic spray method, electrostatic screen method, etc.).

(2) Negative Electrolyte Layer

The electrolyte layer is a layer comprising a solid electrolyte or a layer made from a solid electrolyte. The solid electrolyte is not particularly limited, but is preferably a sulfide solid electrolyte of the present invention.

The electrolyte layer may consist of a solid electrolyte and may further comprise a binder. As the binder, the same binder as the binder of the negative electrode mix of the present invention can be used.

The thickness of the electrolyte layer is preferably 0.001 mm or more and 1 mm or less.

The solid electrolyte of the electrolyte layer may be fused. Fusion means that a part of the solid electrolyte particles dissolve and the dissolved part integrates with other solid electrolyte particles. Further, the electrolyte layer may be a plate-lice body of the solid electrolyte, and as for the plate-like body, there may be cases where part or all of the sold electrolyte particles are dissolved to form a platy-fifes body.

The electrolyte layer can be produced by a publicly known method, for example, a coating method or an electrostatic method (electrostatic spray method, electrostatic screen method, etc.).

(3) Positive Electrode Layer

The positive electrode layer is a layer that comprises a positive electrode active material. Preferably, the positive electrode layer is a layer that comprises the positive electrode mix of the present invention or a layer produced from the positive electrode mix of the present invention.

The thickness of the positive electrode layer is preferably 0.01 mm or more and 10 mm or less.

The positive electrode layer can be produced by a publicly known method. For example, it can be produced by a coating method, an electrostatic method (electrostatic spray method, electrostatic screen method, etc.).

(4) Current Collector

The lithium ion battery of one embodiment of the present invention preferably further comprises a current collector. For example, the negative electrode current collector is provided on the side opposite to the electrolyte layer side of the negative electrode layer, and the positive electrode current collector is provided on the side opposite to the electrolyte layer side of the positive electrode layer.

As the current collector, a plate-like body or a foil-like body, etc. formed of copper, magnesium, stainless steel, titanium, iron, cobalt, nickel, zinc, aluminum, germanium, indium, lithium or an alloy thereof, or the like.

The lithium ion battery of one embodiment of the present invention can be manufactured by attaching and jointing the above-described members. As a method of jointing, there are a method of laminating each member, pressing and crimping the members, a method of pressing through between two rolls (roll to roll), and the like.

Jointing may be conducted with an active material having an ionic conductivity or an adhesive material that does not impair ionic conductivity on the jointing surface.

In the jointing, heat seeing may be conducted within a range that the crystal structure of the solid electrolyte is not changed.

The lithium ion battery of one embodiment of the present invention can also be manufactured by sequentially forming the above-described members. It can be produced by a publicly known method, for example, by a coating method, an electrostatic method (electrostatic spray method, electrostatic screen method, or the like).

EXAMPLES

The present invention is described below in more detail by Examples.

The evaluation method is as follows.

(1) Ionic Conductivity Measurement

The sulfide solid electrolyte produced in each example was filed in a tablet molding machine, and a pressure of 22 MPa was applied to form a molded body. Carbon was placed on both sides of the molded body as an electrode, and pressure was applied again by a tablet molding machine, whereby a molded body for measurement (diameter: about 10 mm, thickness: 0.1 to 0.2 cm) was produced. The ionic conductivity of this molded body was measured by AC impedance measurement. The conductivity values at 25° C. were adopted.

(2) X-Ray Diffraction (XRD) Measurement

A circular pellet having a diameter of 10 mm and a height of 0.1 to 0.3 cm was molded from the powder of the sulfide solid electrolyte produced in each example to obtain a sample. The samples were measured without exposure to air using an XRD airtight holder. The $2\theta$ position of the diffraction peak was determined by the oar raid method using an XRD analysis program JADE.

Measurement was conducted under the following conditions using a powder X-ray diffractometer SmartLab manufactured by Rigaku Corporation.

Tube voltage: 45 kV
Tube current 200 mA
X-ray wavelength: CuK$\alpha$ rays (1.5418 Å)
Optical system: Parallel beam system Slit configuration: Solar slit 5°, incident slit 1 mm, light receiving slit 1 mm Detector Scintillation counter Measurement range: 2θ=10-60 deg Step width, scan speed: 0.02 deg, 1 deg/min In the analysis of the peak position for confirming the existence of the crystal structure from the measurement result, the peak position was obtained by drawing the baseline by cubic approximation using the XRD analysis program JADE.

Si-Relative Half-Value Width and Si-Relative Peak Intensity of Si

The Si-relative half-value width and Si relative peak intensity of the diffraction peak at 2θ=29.7±0.5 deg (diffraction peak B) were calculated by the following procedure.

In the XRD pattern, the minimum diffraction intensity ($I_{back}$) of 2θ in the range of 10 to 60 deg was used as the background. The peak intensity ($I_B$) of the diffraction peak B was calculated by subtracting the diffraction intensity ($I_{back}$) in the background from the actually measured value ($I_{BR}$) of the peak intensity of the diffraction peak B. In the diffracted peak B, two angles (d1, d2) at which the peak intensities are half of the $I_B$ were obtained, and the difference between d1 and d2 was defined as the half-value width A (Δd: actually measured value).

Next, an XRD pattern was measured using Si (manufactured by Rigaku Corporation) as a sample. The X-ray diffraction pattern of Si is shown in FIG. 1. The half-value width of the diffracted peak ($Δd_{si}$) and the peak intensity of the diffracted peak ($i_{Si}$) at 2θ=26.6±0.5 deg were determined in the same manner as in the above-mentioned half-value width A. The background was set to a value of the lowest diffraction intensity in the range of 2θ of 10 to 60 deg.

From the half-value width A (Δd) and the half-value width of Si ($Δd_{si}$), the Si-relative half-value width ($Δd/Δd_{si}$) was calculated. The Si-relative peak intensity ($I_B/I_{Si}$) was calculated from the peak intensity ($I_B$) of the diffracted peak B and the peak intensity ($I_{Si}$) of Si.

Wien the half-value width of Si ($Δd_{si}$) is 0.3 or more, the measurement is defective. Since it is considered that the device itself or the measuring condition is defective, the $Δd_{si}$ is made less than 0.3 by re-measuring under a suitable condition.

(3) ICP Measurement

The sulfide solid electrolyte powder produced in each Example was weighed and collected in a vial in an argon atmosphere. A KOH alkaline aqueous solution was placed in a vial, and the sample was dissolved while taking care to the collection of the sulfur content, and the solution was appropriately diluted and used as a measurement solution. This solution was measured with a Paschen Runge type ICP-OES apparatus (SPECTRO ARCOS manufactured by SPECTRO), and the composition was determined.

A calibration solution for Li, P and S was prepared by using a 1000 mg/L standard solution for ICP measurement, and a calibration solution for Cl and Br was prepared by using a 1000 mg/L standard solution for ion chromatography.

Two measurement solutions were prepared for each sample and five measurements were performed for each measurement solution to calculate an average value. The composition was determined by averaging the measured values of the two measurement solutions.

(4) Solid-State $^{31}$P-NMR Measurements

Approximately 60 mg of powder sample was loaded into a NMR-sample tube and solid-state $^{31}$P-NMR spectrum were obtained using the equipment and conditions described below.

Apparatus: ECZ 400 R apparatus (manufactured by JEOL Ltd.)

Observation nucleus: $^{31}$P

Observation frequency: 161.944 MHz

Measurement temperature: Room temperature

Pulse sequence: Single pulse (using 90° pulse)

90° pulse width: 3.8μ

Waiting time alter FID measurement until the next pulse application: 300 s

Rotational speed of magic angle rotation: 12 kHz

Number of integrations: 16 times

Measurement range: 250 ppm to −150 ppm

Chemical Shift: Obtained by using $(NH_4)_2HPO_4$ (Chemical Shift 1.33 ppm) as an external reference.

The resulting solid-slate $^{31}$P-NMR spectrum were analyzed for peaks ranging of 60 to 120 ppm using the software "FT-NMR" (software contained in the second revised edition of "Data-Processing of FT-NMR by Personal Computer" (Sankyo Shuppan Co., Ltd) to determine separated peaks.

The software calculates separated peaks, calculated values of the NMR signal, and a residual sum of squares R2 using a nonlinear least squares method from NMR signals (experimental value) ranging of 60 to 120 ppm in the solid-state $^{31}$P-NMR spectrum. Peak separation was completed when the residual sum of squares R2 within the analysis range of the experimental value and the calculated value was 0.007 or less and the smallest number of separated peaks was obtained when the maximum peak height was 1. The means and route of the peak fitting are not particularly limited, but the following points should be noted.

The analysis basically starts the fitting assuming that the number of separated peaks is one. However, it is possible to start the analysis with two or more separated peaks considering the measured peak shapes of the solid-state $^{31}$P-NMR spectra. For exempts, when the peak shape of the measured value is asymmetric, and when the measured value has a shoulder portion and a low part, R2 does not become 0.007 or less unless the number of separation peaks is set to two or more.

The fitting is started by inputting an initial value which is considered to be appropriate to the various parameters. Parameters include peak position (ppm), peak height and peak half-value width (Hz). The software calculates the separated peak, the calculated value of the NMR signal, and the residual sum of squares R2 by the nonlinear least squares method, starting from the initial value.

For the peak fitting, a Gaussian function or a Pseudo-Voigt function (linear sum of a Gaussian function and a Lorentz function) is used. The function used is based on a Gaussian function, and the Pseudo-Vogt function is preferably selected when the accuracy is poor. At the time of fitting, the ratio between the Gaussian function and the Lorentz function of the Pseudo-Voigt function is fixed during calculation, but the fixed value needs to be obtained as appropriate.

While finely correcting the above parameters, the fitting is repeated until R2 becomes 0.007 or less. If R2 does not become 0.007 or less, the number of peaks is increased and the analysis is performed in the same manner. Finally, when R2 reaches 0.007 or less, the peak separation is completed. Note that although R2 is set to 0.007 or less as a standard, since the value is preferably smaller, the accuracy may be further increased by repeating the fitting.

In each separated peak obtained by analysis, chemical shifts showing intensities of half of the maximum value exist at one point (CM and Pen: ppm) on both skies of the peak. The half-value widths Hn (n is an integer of 1 or more) of the respective separated peaks n (n is a peak number and is 1 or more integer) were obtained by the following formula.

$$Hn(Hz)=161.944\times(\sigma_{An}-\sigma_{Bn})$$

Further, the area ratio $\varphi_n$ (%) of the respective peaks was obtained from the area $S_n$ of the separated peak n and the sum thereof $S_{al}$ (=$S_1$+$S_2$+ . . . +$S_m$: m is an integer of 1 or more) by the following formula.

$$\varphi_n=100\times S_n/S_{al}$$

For example, a small amount of peaks due to β crystals of $Li_3PS_4$ may be observed at 86 to 87.8 ppm, but in the present application, the peaks are regarded as impurities, and are excluded from the object of calculating the half-value widths and the area ratios. It can also be distinguished from the XRD diffraction pattern that it is an impurity.

Regarding the area ratio of the glass-derived peak $\varphi_{glass}$, a peak in which the half value width of the separated peak was 1000 Hz or more was used as the glass-derived peak, and the total area of the glass-derived peak $S_g$ and the total area of all the peaks $S_{al}$ were determined by the following formula.

$$\varphi_{glass}=100\times S_g/S_{al}$$

(5) Degree of Consolidation

Approximately 0.1 g of the sulfide solid electrolyte produced in the Examples was weighed, Sled in a tablet molding machine having a diameter of 10 mm, and subjected to a pressure of 22 MPa to obtain a molded product. The thickness at that time was measured at four points using a microcaliper, and the actual measured density was obtained from the tablet molding machine and the weighed value with the average value as the thickness.

The calculated densities of $Li_2S$, $P_2S_5$, LiCl and LiBr were each 1.62 g/cm$^3$, 2.09 g/cm$^3$, 2.09 g/cm$^3$ and 3.47 g/cm$^3$, respectively, and the sum of the weighted fractions of the compositions of the respective examples multiplied by the respective calculated densities was used as the calculated density of the compositions. The degree of consolidation was calculated from the measured density and the calculated density by the following formula.

(Degree of consolidation: %)=(measured density)× 100/(calculated density)

[Calculated density=(weight percent of $Li_2S$)×(calculated density of $Li_2S$)/100+(weight percent of $P_2S_5$)×(calculated density of $P_2S_5$)/100+(weight percent of LiCl)×(calculated density of LiCl)/100+(weight percent of LiBr)×(calculated density of LiBr)/100]

Production Example 1

(Production of Lithium Sulfide ($Li_2S$))

In a 500 mL-separable flask equipped with a stirrer, 200 g of LiOH anhydride (manufactured by Honjo Chemical Corporation) dried under an inert gas was prepared. The temperature was raised under a stream of nitrogen, and the internal temperature was maintained at 200° C. Nitrogen gas was switched to hydrogen sulfide gas (Sumitomo Seika Chemicals Company, Limited) at a flow rate of 500 mL/min, and LiOH anhydride and hydrogen sulfide were reacted.

Moisture generated by the reaction was condensed by a condenser and recovered. The reaction was carried out for 6 hours at which time 144 mL of water was recovered. The reaction was continued for an additional 3 hours, but no moisture generation was observed.

The product powder was collected and measured for purity and XRD. As a result, the purity was 98.5%, and the peak pattern of $Li_2S$ was confirmed by XRD.

Example 1

$Li_2S$ produced in Production Example 1 (purity: 98.5%), diphosphine pentasulfide ($P_2S_5$: FS SPEC, manufactured by Thermophos, purity: 99.9% or more), lithium chloride (LiCl: manufactured by Sigma Aldrich, purity: 99%) and lithium bromide (LiBr: manufactured by Sigma Aldrich, purity: 99%) were used as starting materials (hereinafter, the purities of the respective starting materials are the same in all examples). The raw materials were mixed so that the molar ratios of Liss. $P_2S_5$ and LiCl ($Li_2S$:$P_2S_5$:LiCl) were 1.9:0.5:1.6. Specifically, 0.491 g of lithium sulfide, 0.626 g, and 0.382 g were mixed to form a raw material mixture.

The raw material mixture and 30 g of a zirconia ball having a diameter of 10 film were put in a zirconia pot (45 mL) of a planetary ball mill (manufactured by Fritchu Corporation: Model No. P-7) and completely sealed. The inside of the pot was an argon atmosphere. The solid sulfide electrolyte was obtained by mechanical miring (MM) at a rotational speed of 600 rpm in a planetary ball nil for 72 hours.

The ionic conductivity (σ) of the sulfide solid electrolyte was 3.68 mS/cm. The degree of consolidation was 90.3%.

Figure 2:
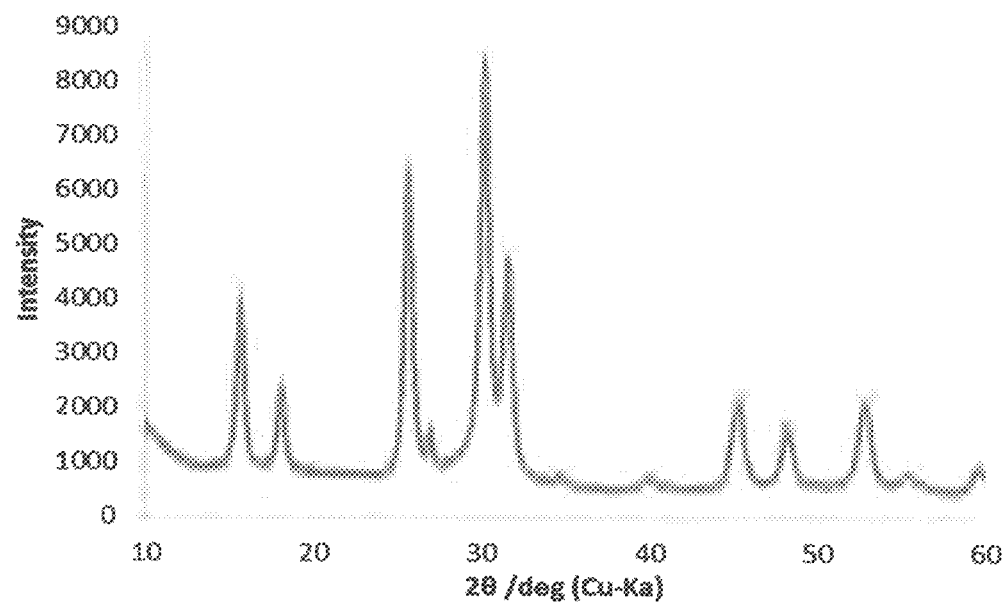
FIG. 2 is an XRD pattern of the sulfide solid electrolyte of Example 1.

The XRD pattern of the sulfide solid electrolyte is shown in FIG. 2. Peaks derived from argyrodite-type crystal structure were observed at 2θ=15.7, 18.0, 25.6, 302, 31.6, 45.3, 48.2, and 52.9 deg.

Figure 3:
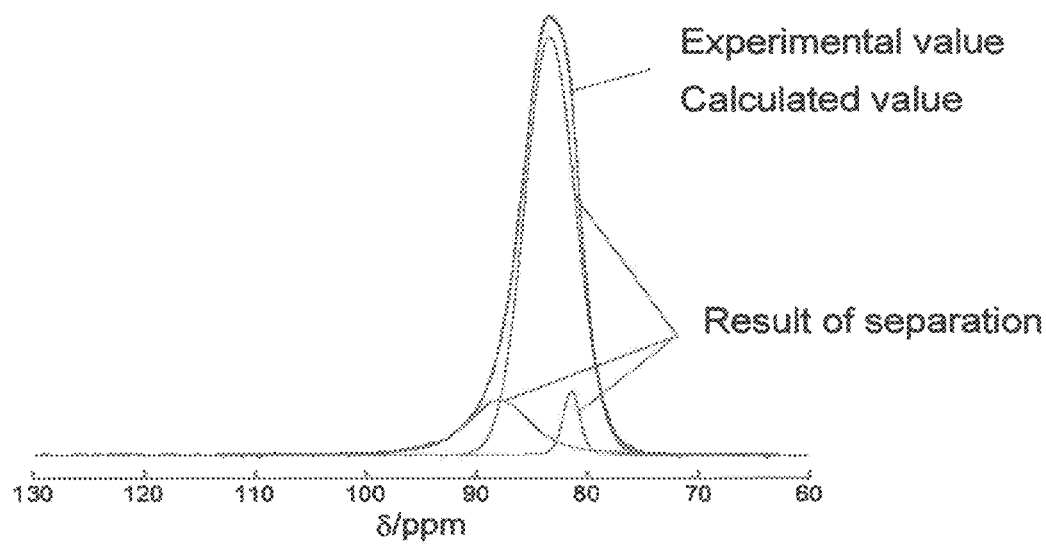
FIG. 3 is a solid-state $^{31}$P-NMR spectrum of the sulfide solid electrolyte of Example 1.

FIG. 3 shows the solid-stale $^{31}$P-NMR spectrum of the sulfide solid electrolyte.

As a result of the analysis, when the number of separated peaks was set to 1 or 2, R2 was not less than 0.007. It can be seen that the peek of the experimental value has a long low part on the high chemical shift side, and the peak top bulges on the low chemical shift side. From the characteristics of the peak shapes, the initial value of the peak position was set to be a position which can be visually recognized as the peak top value position and a position around both ends of the peak. The peak heights were actually measured at the peak position set in each case. As for the half-value width, a value suitable for the peak shape was set as an initial value as appropriate. For the peak function, the Pseudo-Voigt function was used because R2 did not fall below the specified value when the Gaussian function was used. The ratio of the Gaussian function to the Lorentz function (calculated as a fixed value during each fitting) was appropriately set. Fitting was performed until R2 was less than or equal to the specified value. Results are shown in Table 3.

R2 was 4.9×10$^{-3}$. From FIG. 3, it can be confirmed that the experimental values and the calculated values are almost identical to each other.

The sulfide solid electrolyte was analyzed by ICP to determine the molar ratio of each element. As a result, the molar ratio a (Li/P) was 5.4, the molar ratio b (SIP) was 4.4, and the molar ratio c (Cl/P) was 1.6.

The molar ratio of each element in the raw material and the production conditions are shown in Table 1. The Si-relative half-value width and Si-relative peak intensity of the diffraction peak B in the XRD pattern of the sulfide solid electrolyte are shown in Table 2.

The results of measuring the solid-state $^{31}$P-NMR of the sulfide solid electrolyte are shown in Tables 3 and 4.

TABLE 1

| | Element ratio of raw materials | | | | | MM condition | | Heat treatment | |
|---|---|---|---|---|---|---|---|---|---|
| | | | | | | Rotation | | | |
| | Li/P | S/P | X*/P | Cl/P | Br/P | speed (rpm) | Time (h) | Temperature (°C.) | Time (h) |
| Example 1 | 5.4 | 4.4 | 1.6 | 1.6 | — | 600 | 72 | None | |
| Example 2 | 5.2 | 4.2 | 1.8 | 1.2 | 0.6 | 600 | 72 | None | |
| Example 3 | 5.2 | 4.2 | 1.8 | 1 | 0.8 | 600 | 72 | None | |
| Example 4 | 5.4 | 4.4 | 1.6 | 1.0 | 0.6 | 600 | 72 | None | |
| Example 5 | 5.2 | 4.2 | 1.8 | 1.0 | 0.8 | 600 | 40 | None | |
| Comp. Ex. 1 | 5.4 | 4.4 | 1.6 | 1.6 | — | 370 | 15 | 430 | 8 |
| Comp. Ex. 2 | 5.2 | 4.2 | 1.8 | 1.2 | 0.6 | 370 | 72 | None | |
| Comp. Ex. 3 | 5.4 | 4.4 | 1.6 | 1.0 | 0.6 | 370 | 15 | 430 | 8 |

*X is the sum of Cl and Br.

TABLE 2

| | XRD (diffraction peak B) | |
|---|---|---|
| | Si-relative half-value width | Si-relative peak intensity |
| Example 1 | 2.20 | 0.062 |
| Example 2 | 2.29 | 0.064 |
| Example 3 | 2.18 | 0.058 |
| Example 4 | 2.18 | 0.060 |
| Example 5 | 2.21 | 0.063 |
| Comp. Ex. 1 | 1.24 | 0.161 |
| Comp. Ex. 2 | ND | ND |
| Comp. Ex. 3 | 1.28 | 0.155 |
| Example 6 | 2.23 | 0.061 |
| Example 7 | 2.20 | 0.063 |

TABLE 3

| | Separated peak | Peak position (ppm) | Half-value width (Hz) | Area ratio (%) | Area ratio (%) of the peak at half-value width of 500 to 800 Hz |
|---|---|---|---|---|---|
| Example 1 | peak 1 | 88.0 | 840 | 16.6 | 79.0 |
| | peak 2 | 83.3 | 680 | 79.0 | |
| | peak 3 | 81.4 | 223 | 4.4 | |
| Example 2 | peak 1 | 87.2 | 620 | 32.7 | 100 |
| | peak 2 | 84.2 | 580 | 64.3 | |
| | peak 3 | 80.2 | 630 | 3.0 | |
| Example 3 | peak 1 | 88.5 | 700 | 17.7 | 98.1 |
| | peak 2 | 85.1 | 670 | 80.4 | |
| | peak 3 | 79.2 | 420 | 1.9 | |
| Example 4 | peak 1 | 91.9 | 530 | 4.8 | 77.7 |
| | peak 2 | 85.9 | 660 | 72.9 | |
| | peak 3 | 83.9 | 440 | 22.3 | |
| Example 5 | peak 1 | 88.2 | 530 | 15.9 | 90.1 |
| | peak 2 | 83.3 | 660 | 74.2 | |
| | peak 3 | 81.9 | 400 | 10.0 | |
| Comp. Ex. 1 | peak 1 | 85.7 | 290 | 15.2 | 0 |
| | peak 2 | 83.9 | 220 | 28.2 | |
| | peak 3 | 81.7 | 250 | 56.6 | |
| Comp. Ex. 2 | peak 1 | 106.0 | 1340 | 15.4 | 0 |
| | peak 2 | 90.6 | 1640 | 18.2 | |
| | peak 3 | 83.8 | 1064 | 66.4 | |

TABLE 3-continued

| | Separated peak | Peak position (ppm) | Half-value width (Hz) | Area ratio (%) | Area ratio (%) of the peak at half-value width of 500 to 800 Hz |
|---|---|---|---|---|---|
| Comp. Ex. 3 | peak 1 | 88.5 | 230 | 26.6 | 0 |
| | peak 2 | 86.3 | 250 | 38.7 | |
| | peak 3 | 84.3 | 250 | 21.9 | |
| | peak 4 | 82.5 | 230 | 12.9 | |
| Example 6 | peak 1 | 91.8 | 690 | 7.0 | 92.5 |
| | peak 2 | 85.5 | 650 | 85.5 | |
| | peak 3 | 78.1 | 380 | 7.5 | |
| Example 7 | peak 1 | 92.3 | 680 | 5.7 | 97.5 |
| | peak 2 | 85.6 | 720 | 91.8 | |
| | peak 3 | 78.9 | 430 | 2.5 | |

TABLE 4

| | Area ratio of the glass-derived peak ($\varphi_{glass}$:%) |
|---|---|
| Example 1 | 0 |
| Example 2 | 0 |
| Example 3 | 0 |
| Example 4 | 0 |
| Example 5 | 0 |
| Comp. Ex. 1 | 0 |
| Comp. Ex. 2 | 100 |
| Comp. Ex. 3 | 0 |
| Example 6 | 0 |
| Example 7 | 0 |

Example 2

A sulfide solid electrolyte was prepared and evaluated in the same manner as in Example 1 except that the raw material composition and the production conditions were changed as shown in Table 1. Results are shown in Table 2 to 4.

The ionic conductivity (a) of the sulfide solid electrolyte was 7.75 mS/cm. The degree of consolidation was 86.6%.

Example 3

A sulfide solid electrolyte was prepared and evaluated in the same manner as in Example 1 except that the raw material composition and the production conditions were changed as shown in Table 1. Results are shown in Table 2 to 4.

The ionic conductivity (a) of the sulfide solid electrolyte was 7.34 mS/cm. The degree of consolidation was 84.6%.

Figure 4:
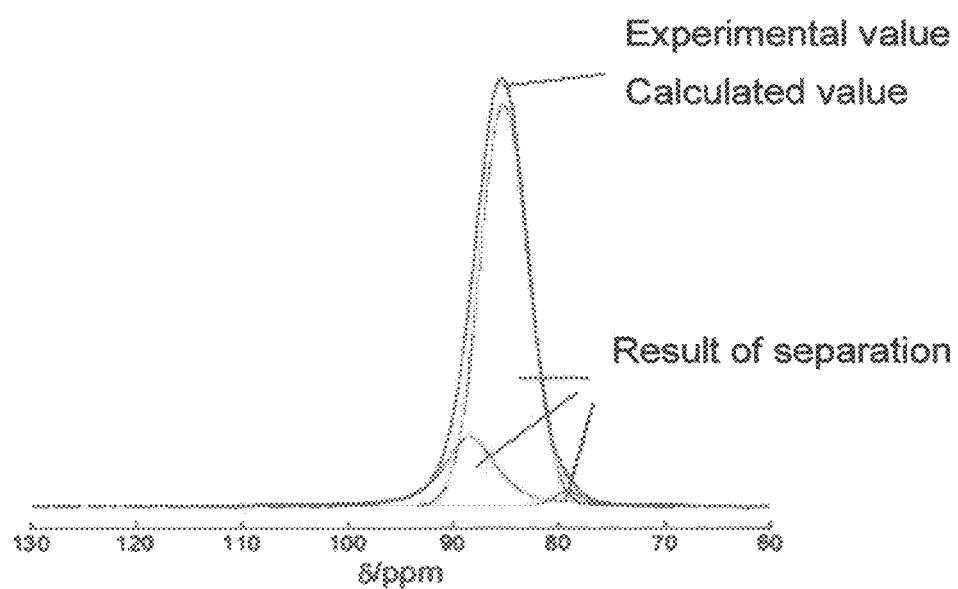
FIG. 4 is a solid-state $^{31}$P-NMR spectrum of the sulfide solid electrolyte of Example 3.

FIG. 4 shows the sold-state $^{31}$P-NMR spectrum of the outride solid electrolyte.

Example 4

A sulfide solid electrolyte was prepared and evaluated in the same manner as in Example 1 except that the raw material composition and the production conditions were changed as shown in Table 1. Results are shown in Table 2 to 4.

The ionic conductivity (σ) of the sulfide solid electrolyte was 455 mS/cm. The degree of consolidation was 85.0%.

Example 5

A sulfide solid electrolyte was prepared and evaluated in the same manner as in Example 1 except that the raw material composition and the production conditions were changed as shown in Table 1. Results are shown in Table 2 to 4.

The ionic conductivity (σ) of the sulfide solid electrolyte was 3.31 mS/cm. The degree of consolidation was 87.7%.

Comparative Example 1

A sulfide solid electrolyte was prepared and evaluated in the same manner as in Example 1 except that the raw material composition and the production conditions were changed and the heat treatment was performed as shown in Table 1. Results are shown in Table 2 to 4. The heat treatment was performed as hollows.

After the mechanical milling treatment using a planetary ball well, about 1.5 g of the obtained powder was packed in a glove box in argon atmosphere, in a Tamman tube (PT2, Tokyo Glass Equipment Co., Ltd.), the opening of the Tamman tube was closed with quartz wool, and sealed with a sealed container made of SUS so as not to enter the atmosphere. The sealed container was then placed in an electric furnace (FUW243PA, manufactured by Advantech Toyo Kaieha, Ltd.) and heat treated. Specifically, the temperature was raised from room temperature to 430° C. at 2.5° C./min (raised to 430° C. for 2.7 hours) and held at 430° C. for 8 hours. Thereafter, it was gradually cooled to obtain a sulfide sold electrolyte.

Figure 5:
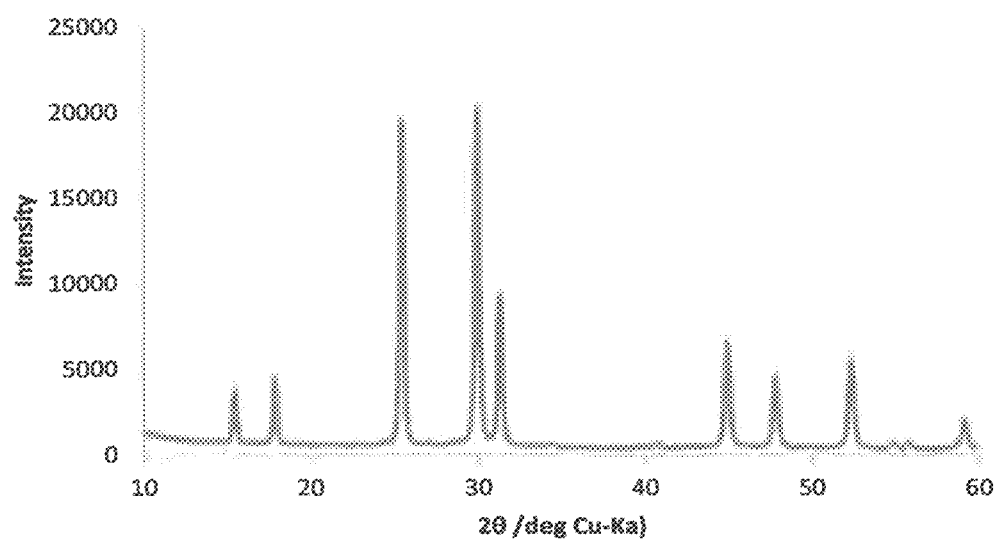
FIG. 5 is an XRD pattern of the sulfide solid electrolyte of Comparative Example 1.
Figure 8:
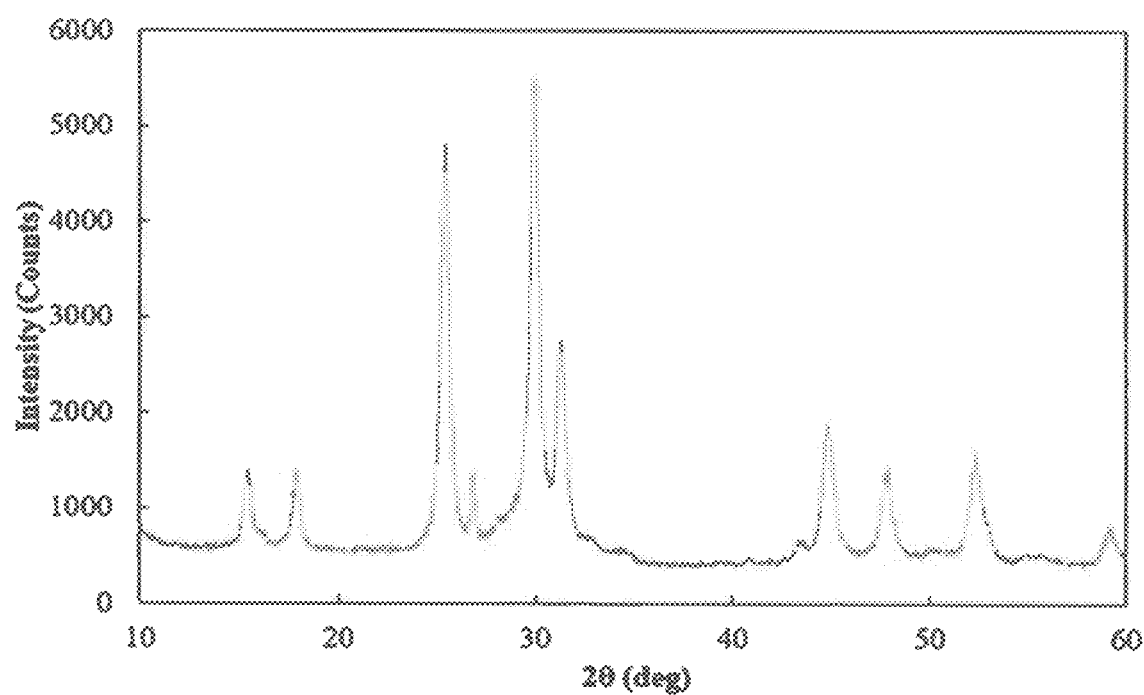
FIG. 8 is an XRD pattern of the sulfide solid electrolyte of Example 7.

The X-ray diffraction pattern of the sulfide solid electrolyte obtained in Comparative Example 1 is shown in FIG. 5. The solid-state $^{31}$P-NMR spectra are shown in FIG. 8.

Figure 6:
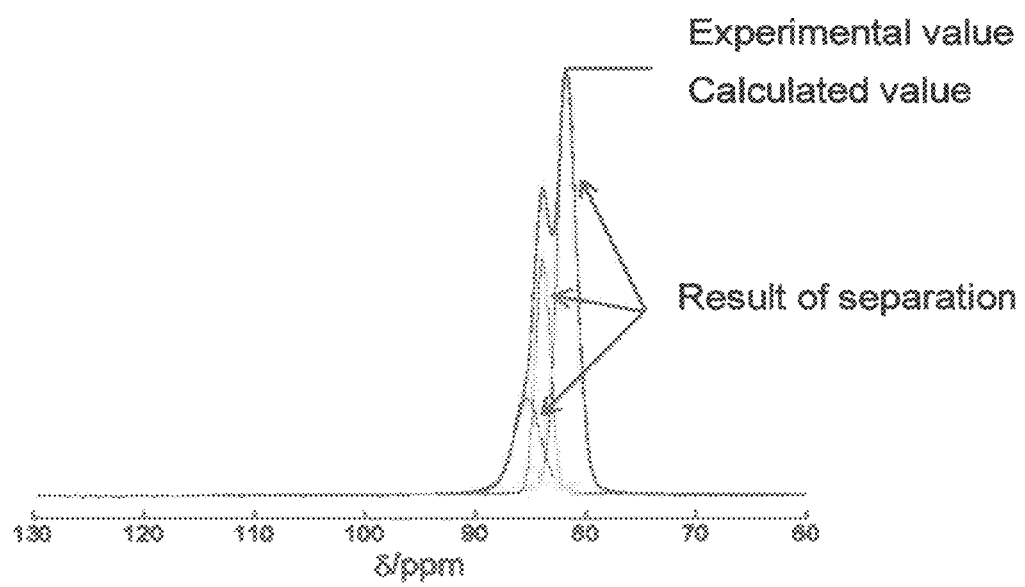
FIG. 6 is a sold-state $^{31}$P-NMR spectrum of the sulfide solid electrolyte of Comparative Example 1.

Since the experimental value shown in FIG. 6 has two peak tops, the number of separated peeks was set to two and analyzed. As a result, R2 was not less than 0.007. Therefore, the number of separation peaks was set to three and analyzed. Initial values of the peak position were two places of the position which can be seen as the peek top in the experimental values, and the periphery of the shoulder observed around the left end of the peek. Since there is a point in the periphery of the left end where the slope of the peak clearly changes, it is considered that the peak exists. The peak heights were actually measured at the peak position set in each case. As for the half-value width, a value suitable for the peak shape was set as an initial value as appropriate. For the peak function, the Pseudo-Vogt function was used because R2 did not fall below the specified value when the Gaussian function was used. The ratio of the Gaussian function to the Lorentz function (calculated as a fixed value during each fitting) was appropriately set. Fitting was performed until R2 was less than or equal to the specified value. Results are shown in Table 3.

R2 was $1.6 \times 10^{-3}$. From FIG. 6, it can be confirmed that the experimental values and the calculated values are almost identical to each other.

The degree of consolidation of the sulfide sold electrolyte obtained in Comparative Example 1 was 79.8%. In Comparative Example 1, since the heat treatment was performed at a high temperature, it is considered that argyrodite-type crystal structure grew largely in a highly ordered state. As a result, it is estimated that the half-value width of the separated peaks of the solid-state $^{31}$P-NMR spectra were narrower than those of Example 1, and the degree of consolidation were reduced.

Comparative Example 2

A sulfide solid electrolyte was prepared and evaluated in the same manner as in Example 1 except that the raw material composition and the production conditions were changed as shown in Table 1. Results are shown in Table 2 to 4.

Figure 7:
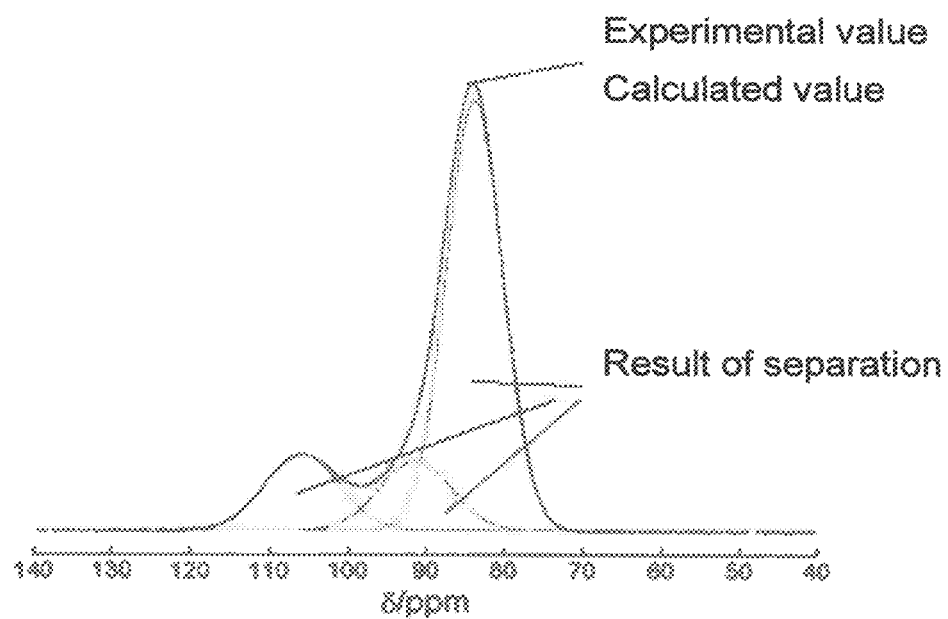
FIG. 7 is a solid-state $^{31}$P-NMR spectrum of the sulfide solid electrolyte of Comparative Example 2.

FIG. 7 shows the solid-state $^{31}$P-NMR spectrum of the sulfide solid electrolyte of Comparative Example 2.

Since the experimental value shown in FIG. 7 has two peak tops, the number of separated peaks was set to two and analyzed. As a result, since R2 was not 0.007 or less, the number of separation peaks was set to three and analyzed. Initial values of the peak position were two locations of the position which were visible as the peak top in the experimental values, and around the midpoint of the two peak tops. A peak is considered to exist because there is a point where the slope of the peak dearly changes in the periphery of the midpoint between the two peak tops. The peak heights were actually measured at the peak position set in each case. As for the half-value width, a value suitable for the peak shape was set as an initial value as appropriate. As the peak function, a Gaussian function was used. Fitting was performed until R2 was less than or equal to the specified value. Results are shown in Table 3.

R2 was $3.9 \times 10^{-4}$. From FIG. 7, it can be confirmed that the experimental values and the calculated values are almost identical to each other.

The ionic conductivity (σ) of the sulfide solid electrolyte of Comparative Example 2 was 0.45 mS/cm. In Comparative Example 2, since the mechanical milling treatment by the planetary ball nil was performed at a conventional rotational speed, it is considered that argyrodite-type crystal structure was not formed in the sulfide solid electrolyte and was in a glassy state. As a result, the ionic conductivity was much lower than that of Example.

Comparative Example 3

A sulfide solid electrolyte was produced and evaluated in the same manner as in Comparative Example 1 except that the raw material composition and the production conditions were changed as shown in Table 1. Results are shown in Table 2 to 4. The degree of consolidation of the sulfide solid electrolyte obtained in Comparative Example 3 was 78.8%.

Example 6

The raw materials were mixed so that the molar ratios of the $Li_2S$, $P_2S_5$, LiCl and LiBr ($Li_2S:P_2S_5:LiCl:LiBr$) were 1.9:0.5:1.0:0.8. Specifically, 2.98 g of $Li_2S$, 3.79 g of $P_2S_5$ and 1.45 g of LiCl and 1.78 g of LiBr were mixed to form a raw material mixture.

A planetary ball mill larger than the planetary ball mill used in Example 1 (Model No. P-7) was used.

The raw material mixture and 600 g of a zirconia ball having a diameter of 10 mm were put in a zirconia pot (500 mL) of a planetary ball mill (manufactured by Fritchu Corporation: Model No. P-5) and completely sealed. The inside of the pot was an argon atmosphere. The sample was obtained by mechanical milling at a rotational speed of 300 rpm in a planetary ball mill for 72 hours. The rotational speed of the planetary ball mill (Model No. P-5) is conventionally set to about 200 rpm.

The molar ratio of each element in the raw material and the production conditions are shown in Table 5. The Si-relative half-value width and Si-relative peak intensity of the diffraction peak B in the XRD pattern of the sulfide solid electrolyte are shown in Table 2. The results of measuring the sold $^{31}$P-NMR of the sulfide solid electrolyte are shown in Tables 3 and 4.

The ionic conductivity (σ) of the sulfide solid electrolyte was 102 mS/cm. The degree of consolidation was 87.3%.

TABLE 5

|  | Element ratio of raw materials | | | | | MM condition | | Heat treatment | |
|---|---|---|---|---|---|---|---|---|---|
|  | Li/P | S/P | X*/P | Cl/P | Br/P | Rotation speed (rpm) | Time (h) | Temperature (° C.) | Time (h) |
| Example 6 | 5.4 | 4.4 | 1.6 | 1.0 | 0.6 | 300 | 72 | None | |

*X is the sum of Cl and Br.

Example 7

The raw materials were mixed so that the molar ratios of Li$_2$S, P$_2$S$_5$, LiCl and LiBr (Li$_2$S:P$_2$S$_5$:LiCl:LiBr) were 1.9: 0.5:1.0:0.6. Specifically, lithium sulfide 29.80 g, 37.94 g, 14.47 g, and 17.79 g were mixed to obtain a raw material mixture.

The raw material mix and 2 kg of zirconia balls having a diameter of 5 mm were placed in a reactor vessel (2 L) of a nanomec reactor (manufactured by Techno Eye Co., Ltd.: Model No. CM-01) and completely sealed. The inside of the reaction vessel was a nitrogen atmosphere. The number of revolutions of the nanomec reactor was 1500 rpm for 45 seconds, followed by 750 rpm for 15 seconds for one cycle. The above cycle was repeated until the integrated power was about 20 kWh/kg to obtain a sulfide solid electrolyte. The total number of cycles was 170. The power was calculated from the current value in each cycle.

The XRD pattern of the sulfide solid electrolyte is shown in FIG. 8. Peaks derived from argyrodite-type crystal structure were observed at 2θ=15.7, 18.0, 25.6, 30.2, 31.6, 45.3, 48.2, and 52.9 deg.

The ionic conductivity (a) of the sulfide solid electrolyte was 3.93 mS/cm. The degree of consolidation was 86.3%.

From Examples 1 to 7, it can be confirmed that the sulfide solid electrolyte of the present invention has excellent degree of consolidation and ionic conductivity in a well-balanced manner.

Reduced Two-Body Distribution Function

The reduced two body distribution function [G(r)] was calculated for the sulfide solid electrolyte obtained in Example 4 and Comparative Example 3 under the following conditions.

Measuring device: SPring-6 BL04B2
Sample: encapsulated in a 2.0 mm diameter glass capillary
Incident X-ray: 61.36 keV (λ=0.2020 Å)
Measured range: 2θ=0.3 to 48° (Q=0.2 to 25.7 Å$^{-1}$)

The scattering intensity I(2θ) obtained by the experiment was converted by the following procedure to obtain G(r).

The scattering angle 2θ was converted into a scattering vector Q by the following formula (1).

$$Q = \frac{4\pi}{\lambda}\sin\frac{2\theta}{2} \quad (1)$$

The scattering intensity I(Q) was subjected to background correction, Compton scattering correction, and absorbance correction according to the following formula (2).

$$I_s^{coh} = \frac{I_{obs}(Q) - I_{BG}(Q) - I_{comp}(Q)}{P(Q)A} \quad (2)$$

Here, $I_s^{coh}$ is the coherent scattering intensity of the sample, $I_{obs}(Q)$ is the experimental scattering intensity of the sample, $I_{BG}(Q)$ is the scattering intensity of the glass capillary only, $I_{comp}(Q)$ is Compton scattering, P(Q) is the polarization factor, and A is the absorptive factor.

Structural factor S(Q) were obtained from I(Q) by the following formula (3).

$$S(Q) = \frac{I_s^{coh}(Q)/N + <f(Q)>^2 - <f(Q)^2>}{<f(Q)>^2} \quad (3)$$

In the formula (3). N is the normalization constant corresponding to the number of particles, $<f(Q)>^2$ is the square of the atom form factor mean, and $<f(Q)^2>$ is the square mean of the atom form factor.

G(r) was calculated by Fourier transforming the obtained structural factors S(Q) by the blowing formula (4).

$$G(r) = \frac{2}{\pi}\int_{Q\,min}^{Q\,max} Q[S(Q) - 1]\sin(Qr)dQ \quad (4)$$

Figure 9:
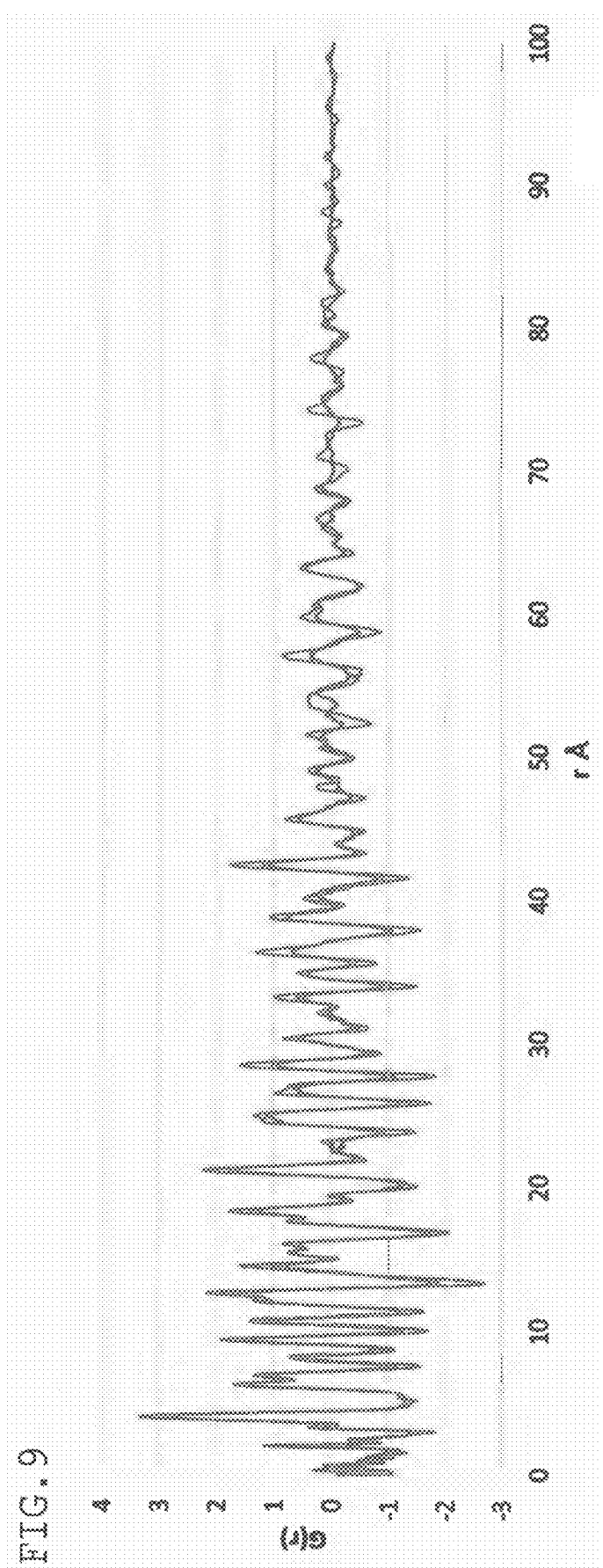
FIG. 9 is a reduced pair distribution function of Example 4 and Comparative Example 3.
Figure 10:
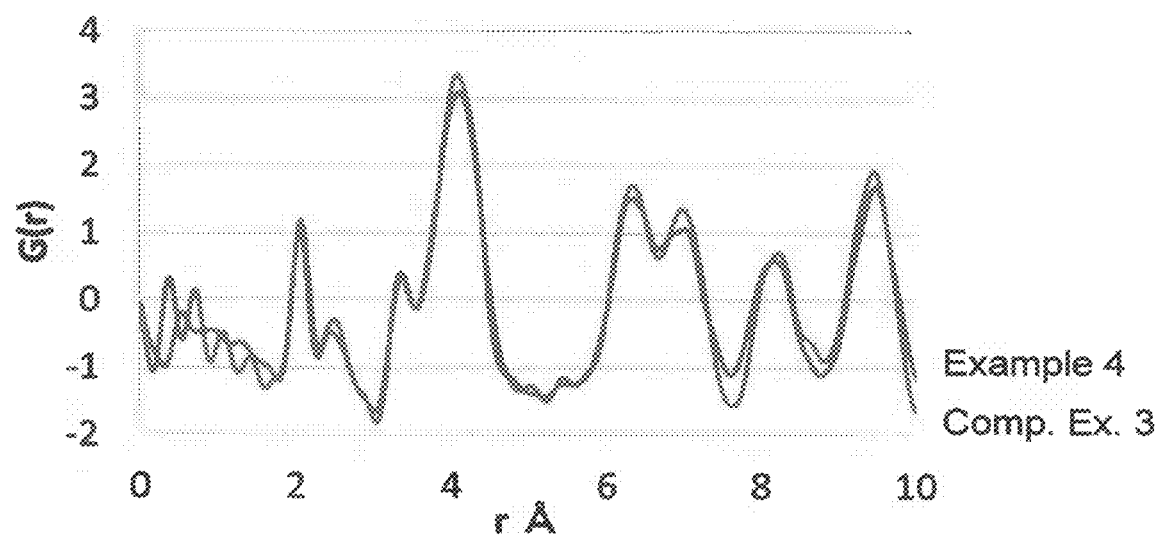
FIG. 10 is an enlarged view of r=0 to 10 Å of FIG. 9.
Figure 11:
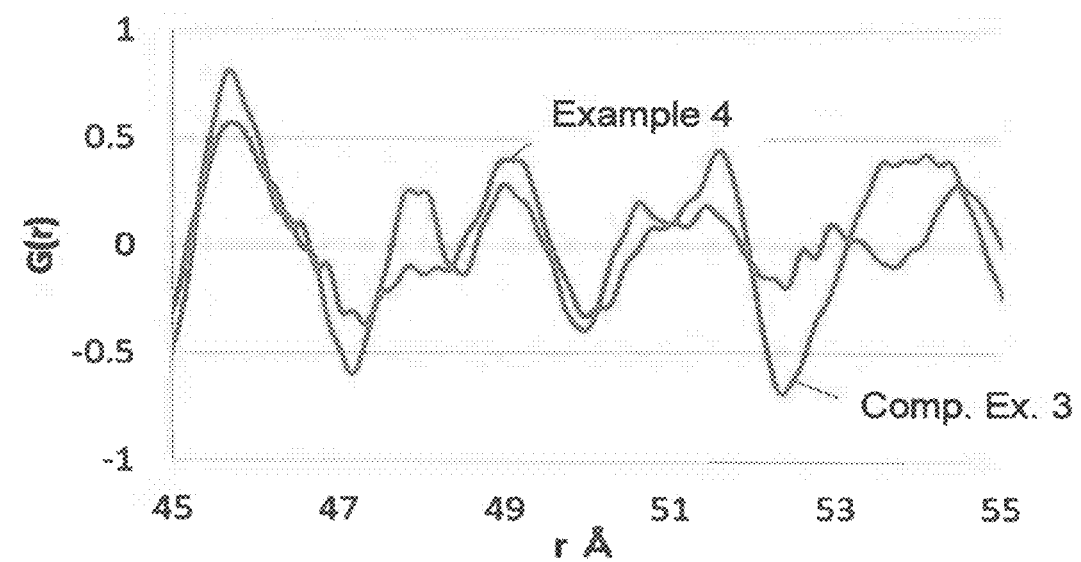
FIG. 11 is an enlarged view of r=45 to 55 Å in FIG. 9.

FIG. 9 is a reduced two-body distribution function of Example 4 and Comparative Example 3. FIG. 10 is an enlarged view of r=0 to 10 Å in FIG. 9, and FIG. 11 is an enlarged view of r=45 to 55 Å in FIG. 9.

Comparing Example 4 with Comparative Example 3, the periodicity of both in the short-distance range of less than 5 nm is equivalent. This suggests that both Example 4 and Comparative Example 3 have the same crystal structure in the distance range of less than 5 nm. On the other hand, it is understood that different periodicities are exhibited in the long-distance range of 5 to 10 nm. In Comparative Example 3, it is easily inferred that grans are grown to 5 nm or more by heat treatment, but Example 4, which is not heat treated, also maintains constant periodicity, which suggests that it has not an amorphous structure but a structure in which crystallites of about 5 nm or less having different orientations are aggregated.

TEM Observation

Powder samples of the sulfide solid electrolyte obtained in Example 1 and Comparative Example 1 were dry-dispersed under argon atmosphere, set on a cryaholder as a refrigeration unit, and observed under a transmission electron microscope (TEM, ARM200F manufactured by JEOL Ltd.) at a low temperature. The acceleration voltage was 200 kV. In the bright field image, it was confirmed that the sample after being irradiated with the electron beam was not damaged. Wien observed by a dark field image using only a part of the electron beam diffracted spots, the sulfide solid electrolyte of Comparative Example 1 had a particle diameter of 50 nm or more, whereas in Example 1, the particle diameter was 5 to 20 nm.

Figure 12:
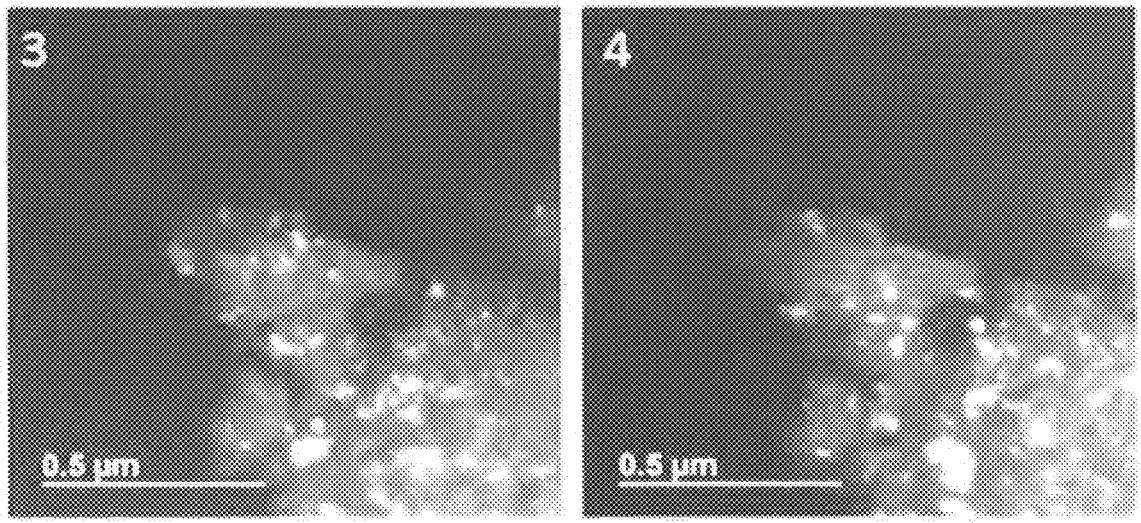
FIG. 12 is a dark field image of TEM of the sulfide solid electrolyte of Example 1.
Figure 13:
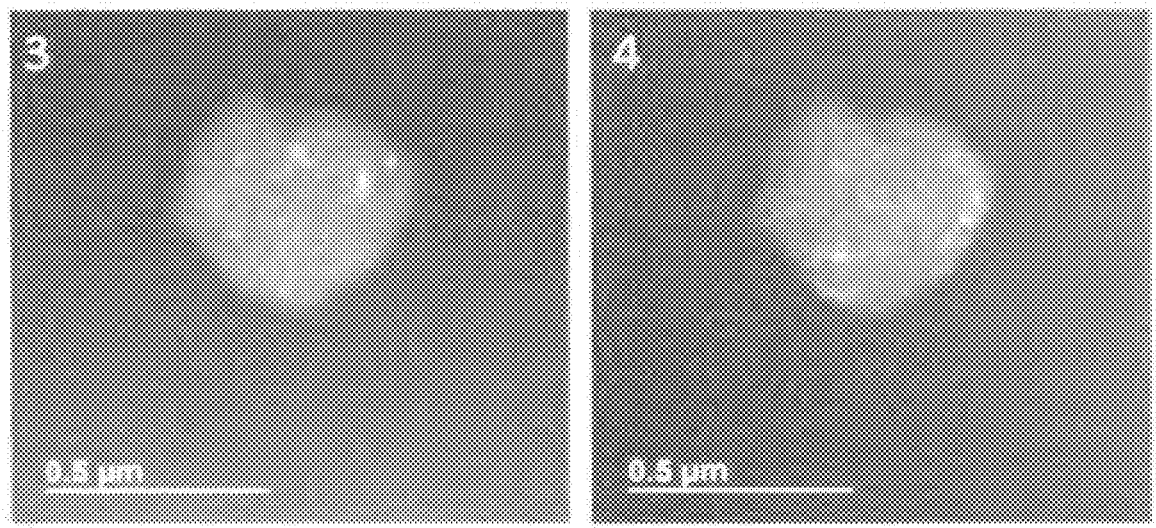
FIG. 13 is a dark field image of TEM of the sulfide solid electrolyte of Comparative Example 1.

FIG. 12 shows a dark field image of the TEM of the sulfide solid electrolyte of Example 1, and FIG. 13 shows a dark field image of the TEM of the sulfide solid electrolyte of Comparative Example 1. In photograph No. 3 and 4, the same sample was observed by changing the objective diaphragm insert position.

The sulfide solid electrolyte of Comparative Example 1 (FIG. 13) appears as uniform particles, whereas the sulfide solid electrolyte of Example 1 (FIG. 12) appears as bright small grains (crystallites) dispersed. It is inferred from the brightness of the diffraction spot that the crystallinity of the fine-grained crystallites is high. This indicates that the sulfide solid electrolyte of Example 1 is composed of fine-grained crystallites.

In photographs No. 3 and 4 of FIG. 12, the objective diaphragm insert position, i.e., the presence position of the crystal when the orientation of the diffraction crystal plane is changed, is observed. In photographs No. 3 and 4, it can be confirmed that the fine particles of high radiance, i.e., crystallites, are present in various position dispersions. In addition, from the dispersed state, it is considered that the neighboring fine particles are not so aligned.

White embodiments and/or Examples of the invention have been described in some detail above, those skilled in the art will readily make many changes to these Illustrative embodiments and/or examples without materially departing from the novel teachings and advantages of the invention. Accordingly, many of these modifications are within the scope of the present invention.

The documents described in the specification and the specification of Japanese application(s) on the basis of which the present application claims Paris convention priority are incorporated herein by reference in its entirety.

The invention claimed is:

1. A sulfide solid electrolyte, comprising:
   lithium;
   phosphorus; and
   sulfur,
   wherein the sulfide solid electrolyte has a diffraction peak A at $2\theta=25.2\pm0.5°$ and a diffraction peak B at $29.7\pm0.5°$ in powder X-ray diffraction using CuKα rays, and
   wherein the sulfide solid electrolyte has a crystallite diameter in a range of from 5 to 20 nm.

2. The electrolyte of claim 1, wherein a ratio of an area of a glass-derived peak to a total area of all peaks in a range of from 60 to 120 ppm, observed in solid-state $^{31}$P-NMR measurements, is in a range of from 0 to 10%.

3. The electrolyte of claim 1, further comprising:
   a halogen.

4. The electrolyte of claim 3, wherein an Li/P molar ratio of the lithium to the phosphorus, a, an S/P molar ratio of the sulfur to the phosphorus, b, and an X/P molar ratio of the halogen to the phosphorus, c, satisfy formulas (A) to (C):

$$5.0 \leq a \leq 7.5 \quad (A);$$

$$6.5 \leq a+c \leq 7.5 \quad (B); \text{ and}$$

$$0.5 \leq a-b \leq 1.5 \quad (C),$$

wherein in the formulas, b>0 and c>0.

5. The electrolyte of claim 3, having a composition of formula (1):

$$\text{Li}_a(\text{P}_{1-\alpha}\text{M}_\alpha)\text{S}_b\text{X}_c \quad (1)$$

wherein
M is Si, Ge, Sri, Ph, B, Al, Ga, As, Sb, and/or Bi, and
X is F, Cl, Br, and/or I,
α is $0 \leq \alpha \leq 0.3$,
a to c satisfy formulas (A) to (C):

$$5.0 \leq a \leq 7.5 \quad (A)$$

$$6.5 \leq a+c \leq 7.5 \quad (B)$$

$$0.5 \leq a-b \leq 1.5 \quad (C)$$

wherein in the formulas (B) and (C), b>0 and c>0.

6. The electrolyte of claim 3, comprising chlorine.

7. The electrolyte of claim 3, comprising chlorine and bromine.

8. An electrode mix, comprising:
   the sulfide solid electrolyte of claim 1; and
   an active material.

9. A lithium ion battery, comprising:
   the sulfide solid electrolyte of claim 1.

10. An electrode mix, produced from the sulfide solid electrolyte of claim 1.

11. A lithium ion battery, produced from the sulfide solid electrolyte of claim 1.

12. A lithium ion battery, comprising:
    the electrode mix of claim 8.

13. A lithium ion battery, produced from the electrode mix of claim 8.

14. A lithium ion battery, produced from the electrode mix of claim 10.

* * * * *